US011032710B2

(12) United States Patent
Faccin et al.

(10) Patent No.: US 11,032,710 B2
(45) Date of Patent: Jun. 8, 2021

(54) SYSTEMS AND METHODS OF SUPPORTING DEVICE TRIGGERED RE-AUTHENTICATION OF SLICE-SPECIFIC SECONDARY AUTHENTICATION AND AUTHORIZATION

(71) Applicant: QUALCOMM Incorporated, San Diego, CA (US)

(72) Inventors: Stefano Faccin, San Ysidro, CA (US); Mahmoud Watfa, St-Leonard (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/791,357

(22) Filed: Feb. 14, 2020

(65) Prior Publication Data

US 2020/0267554 A1  Aug. 20, 2020

Related U.S. Application Data

(60) Provisional application No. 62/806,575, filed on Feb. 15, 2019.

(51) Int. Cl.
*H04W 12/08* (2021.01)
*H04W 12/06* (2021.01)
(52) U.S. Cl.
CPC ........... *H04W 12/08* (2013.01); *H04W 12/06* (2013.01)
(58) Field of Classification Search
CPC .............................. H04W 12/08; H04W 12/06
USPC ........................................................ 455/411
See application file for complete search history.

(56) References Cited

U.S. PATENT DOCUMENTS

2018/0367980 A1\* 12/2018 Lee ..................... H04W 48/08

OTHER PUBLICATIONS

"3rd Generation Partnership Project; Technical Specification Group Radio Access Network; 5GS; User Equipment (UE) Conformance Specification; Part 1: Protocol (Release 15)", 3GPP Draft, 3GPP TS 38.523-1 V15.2.1, 38523-1-F21, 3GPP, Mobile Competence Centre,France, (Jan. 8, 2019), pp. 1-897, Retrieved from the Internet: URL: http://www.3gpp.org/ftp/tsg%5Fran/WG5%5FTest%5Fex%2DT1/Working%5Fdocuments/draft%5Fspecs%5Fwith%5FCRs%5Fimplemented/after%5FRAN5%2D81/clean/38523%2D1%2Df21%2Ezip, Section 9, Section 4.2.

"3rd Generation Partnership Project, Technical Specification Group Services and System Aspects, Study on Enhancement of 5GS for Vertical and LAN Services (Release 16)", 3GPP Standard, Technical Report, 3GPP TR 23.734, 3rd Generation Partnership Project (3GPP), Mobile Competence Centre, 650, Route Des Lucioles , F-06921 Sophia-Antipolis Cedex, France, No. V16.0.0, Dec. 19, 2018 (Dec. 19, 2018), pp. 1-107, XP051591220, [retrieved on Dec. 19, 2018] paragraph [6.18.].

(Continued)

*Primary Examiner* — Joel Ajayi

(57) ABSTRACT

Various aspects of the present disclosure include methods, network servers or components and user equipment devices configured to authorize network slices that are associated with services provided by external providers. Various aspects enable access and use of network slices by user equipment devices connected to a network (e.g., 5G or New Radio network) via network components associated with a service provider by generating an allowed network slice selection assistance information (Allowed NSSAI) and an Unauthorized NSSAI, and sending the Allowed NSSAI and Unauthorized NSSAI to a user equipment device.

15 Claims, 11 Drawing Sheets

(56) References Cited

OTHER PUBLICATIONS

International Search Report and Written Opinion—PCT/US2020/018457—ISAEPO—dated Apr. 3, 2020, 17 pages.
Qualcomm Inc: "Addition of 5GC TC—Initial Registration / 5GS services / NSSAI Handling", 3GPP TSG-RAN5 Meeting #4-5G-NR Adhoc, 3rd Generation Partnership Project, Mobile Competence Centre, 650, Route Des Lucioles, F-06921 Sophia-Antipolis Cedex, France, vol. RAN WG5, No. Singapore, Jan. 21, 2019-Jan. 25, 2019, (Jan. 25, 2019), 15 Pages, Retrieved from the Internet: URL: http://www.3gpp.org/ftp/tsg%5Fran/WG5%5FTest%5Fex%2DT1/TSGR5%5FAHs/2019%2D01%2D21%5F5G%2DNR%5FAdhoc%5F4/Docs/R5%2D190703%2Ezip.

\* cited by examiner

SYSTEMS AND METHODS OF SUPPORTING DEVICE TRIGGERED RE-AUTHENTICATION OF SLICE-SPECIFIC SECONDARY AUTHENTICATION AND AUTHORIZATION

RELATED APPLICATIONS

This application claims the benefit of priority to U.S. Provisional Application 62/806,575 entitled "Systems and Methods of Supporting Device Triggered Re-Authentication of Slice-Specific Secondary Authentication and Authorization" filed Feb. 15, 2019, the entire contents of which are hereby incorporated by reference for all purposes.

BACKGROUND

Cellular and wireless communication technologies have seen explosive growth over the past several years. This growth has been fueled by better communications hardware, larger networks, and more reliable protocols. Wireless service providers are now able to offer their customers an ever-expanding array of features and services, and provide users with unprecedented levels of access to information, resources, and communications. To keep pace with these service enhancements, user equipment devices (e.g., cellular phones, tablets, laptops, etc.) have become faster and more powerful than ever, and now commonly include multiple processors, system-on-chips (SoCs), memories, and other resources (e.g., power rails, etc.) that support high-speed communications and allow device users to execute complex and power intensive software applications on their user equipment devices.

SUMMARY

Various aspects include methods performed by a network server for authorizing access to network slices that are associated with a service provided by an external provider for access and use by a user equipment device connected to a network via a network component that is associated with a service provider. Various aspects may include generating allowed network slice selection assistance information identifying network slices that were authorized by at least one of the service provider or the external provider, generating rejected network slice selection assistance information identifying network slices that have not been authorized, and sending to the user equipment device the allowed network slice selection assistance information and the rejected network slice selection assistance information.

In some aspects, generating the rejected network slice selection assistance information identifying the network slices that have not been authorized may include generating network slice selection assistance information that identifies network slices that have not been authorized by at least one or more of the service provider or the external provider, and includes a rejection cause value for each network slice that identifies a reason each network slice has not been authorized.

In some aspects, generating the allowed network slice selection assistance information identifying the network slices that were authorized by at least one of the service provider or the external provider may include generating an allowed network slice selection assistance information information-element (Allowed NSSAI IE) that identifies the network slices that were authorized by at least one of the service provider or the external provider. In some aspects, generating the rejected network slice selection assistance information identifying the network slices that have not been authorized may include generating rejected network slice selection assistance information that identifies network slices that have not been authorized by at least one or more of the service providers or the external provider.

Further aspects may include a network server configured to perform one or more operations of the methods summarized above. Further aspects may include a non-transitory processor-readable storage medium having stored thereon processor-executable instructions configured to cause a processor or server to perform operations of the methods summarized above. Further aspects include a network server having means for performing functions of the methods summarized above.

Further aspects include methods performed by a processor in a user equipment device for accessing network slices that are associated with a service provided by an external provider for access and use by the user equipment device connected to a network via a network component that is associated with a service provider. Such aspects may include receiving from a network server allowed network slice selection assistance information identifying network slices that were authorized by at least one of the service provider or the external provider, receiving from the network server rejected network slice selection assistance information identifying network slices that have not been authorized, adding a network slice included in the rejected network slice selection assistance information to a requested network slice selection assistance information information-element (Requested NSSAI IE), and sending, by the processor in the user equipment device, the Requested NSSAI IE to the network server.

In some aspects, receiving the allowed network slice selection assistance information identifying the network slices that were authorized by at least one of the service provider or the external provider may include receiving an Allowed NSSAI IE that identifies the network slices that were authorized by at least one of the service provider or the external provider, and receiving from the network server rejected network slice selection assistance information identifying the network slices that have not been authorized may include receiving rejected network slice selection assistance information that identifies network slices that have not been authorized by at least one or more of the service provider or the external provider.

Some aspects may include adding to the Requested NSSAI IE a network slice included in the Allowed NSSAI for an access type over which the Requested NSSAI IE is sent to the network server. Some aspects may include forgoing re-registration attempts for the network slices included in the rejected network slice selection assistance information until a network slice-specific authorization procedure has completed. Some aspects may include determining whether the network slice-specific authorization procedure has completed, and adding to the Requested NSSAI IE a network slice included in the Rejected NSSAI in response to determining that the network slice-specific authorization procedure has completed, the network slice can now be authorized, or that the network slice should be resubmitted for authorization by the external provider. Some aspects may include determining whether a network slice included in the Rejected NSSAI should be resubmitted for authorization by the external provider.

Further aspects may include a user equipment device having a processor configured to perform one or more operations of the methods summarized above. Further aspects may include a non-transitory processor-readable storage medium having stored thereon processor-executable instructions configured to cause a processor of a user equipment device to perform operations of the methods summarized above. Further aspects include a user equipment device having means for performing functions of the methods summarized above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
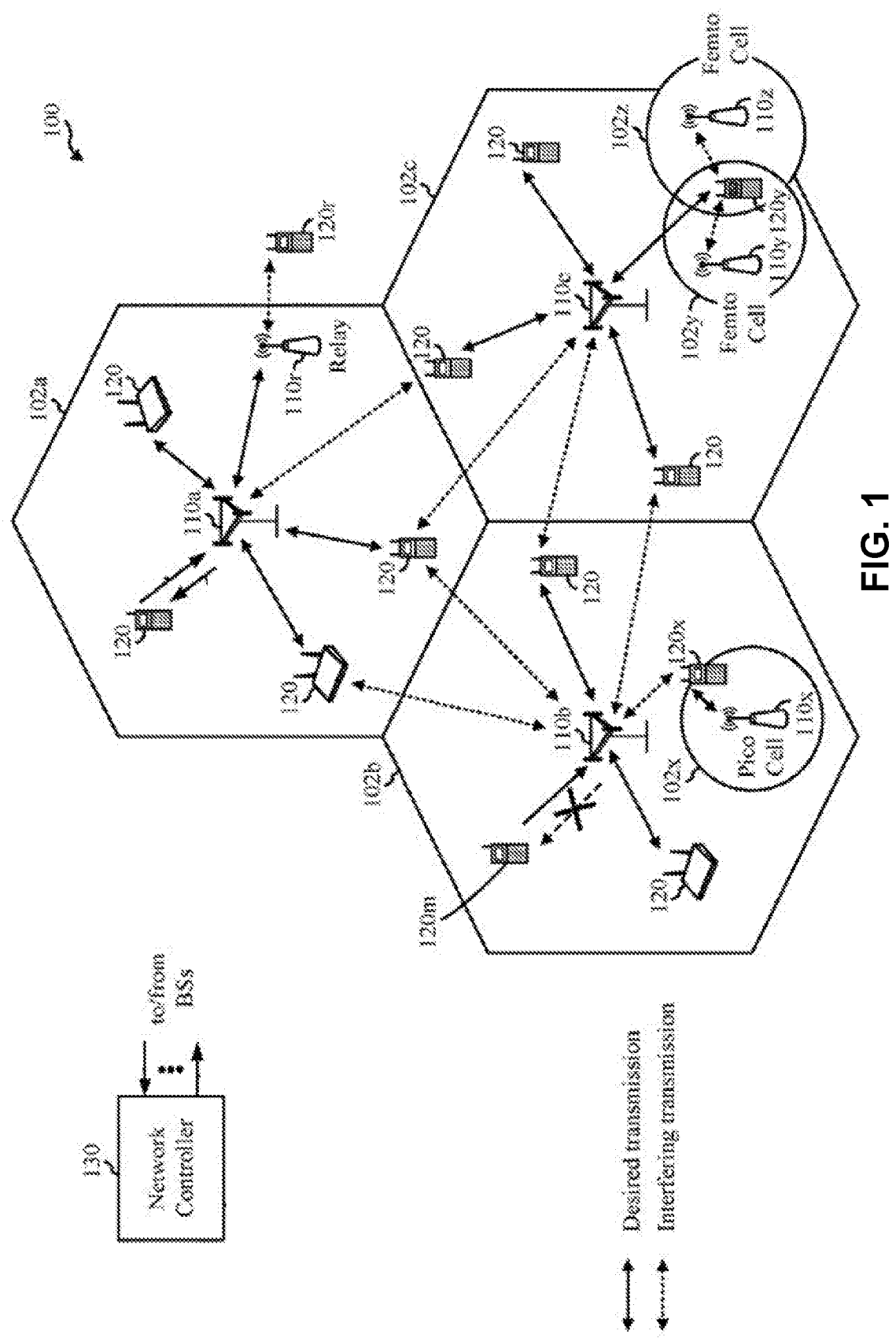
FIG. 1 is a system block diagram conceptually illustrating an example telecommunications system.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The various embodiments include methods, and computing devices (e.g., user equipment devices, network servers, etc.) configured to implement the methods, for efficiently authorizing and/or re-authorizing network slices that are associated with services provided by external providers for access and use by user equipment devices connected to a network (e.g., a 5G or New Radio network) via network components associated with a service provider. A network component, such as a core access and mobility management function (AMF) component, may be configured to generate and send to the user equipment device an allowed network slice selection assistance information (Allowed NSSAI) information element (IE), a Pending NSSAI IE and/or an Unauthorized NSSAI IE. The Allowed NSSAI IE may identify the network slices that were authorized by at least one or both of the service provider or the external provider. The Unauthorized NSSAI (or Pending NSSAI) IE may identify the network slices that were authorized by the service provider, but which failed authorization/verification by the external provider.

A processor in the user equipment device may be configured to determine, either periodically or based on receiving a trigger, whether a network slice included in the Pending NSSAI IE should be resubmitted for authorization or verification by the external provider. In response to determining that the network slice should be resubmitted, the processor may perform a registration procedure that includes adding a network slice included in the Pending NSSAI IE (or in an Unauthorized NSSAI IE) to a requested NSSAI (Requested NSSAI IE), and sending the Requested NSSAI IE to the AMF.

To protect the network from denial of service attacks and excess network traffic that may be caused by repeatedly requesting authorization to a slice that the network included in the Unauthorized NSSAI element, AMF may be configured to add a network slice to a Rejected NSSAI element for a registration area in response to the AMF determining that the user equipment has repeatedly unsuccessfully attempted registration for a network slice that has repeatedly failed authorization/verification by the external provider. To protect the network from denial of service attacks and excess network traffic that may be caused by repeatedly requesting authorization to a slice that the network included in the Unauthorized NSSAI element, AMF may be configured to provide a slice-specific backoff timer associated to the slice; upon receiving such timer, the user equipment may exclude or not include the S-NSSAI of the slice associated to the backoff timer in a Requested NSSAI until the timer expires.

The terms "user equipment device" and "user equipment" may be used interchangeably herein to refer to any one or all of cellular telephones, smartphones, portable computing devices, personal or mobile multi-media players, laptop computers, tablet computers, smartbooks, IoT devices, palm-top computers, wireless electronic mail receivers, multimedia Internet enabled cellular telephones, connected vehicles, wireless gaming controllers, and similar electronic devices that include a memory, wireless communication components and a programmable processor for which performance.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices. Many user equipment devices include an SOC that operates as the device's CPU (herein "SOC-CPU").

The term "system in a package" (SIP) is used herein to refer to a single module or package that may contain multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile communication device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, IP core, GPU core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "subscriber" may be used in this application to the end consumer of services provided by a network operator.

The term "control plane" may be used in this application to refer to signaling traffic between network components. Control plane data typically does not include the payload or actual user data. Examples of control plane data include information relating to communication setup, security, authentication, charging, enforcement of policy rules, etc.

The term "infrastructure as a service (IaaS)" may be used in this application to refer to a component or a system that provides consumers with basic or fundamental computing infrastructure resources (e.g., computing power, memory, network connectivity, disk space, etc.) via a cloud computing environment or over the Internet. An IaaS system may eliminate the need for network operators and/or equipment manufacturers to buy and manage proprietary computing resources or appliances. An IaaS system may rely on virtualization and/or offer computing infrastructure as virtual machines or as virtualized computing resources.

The term "software defined networking (SDN)" may be used in this application to refer to components or systems that enable network programmability by utilizing an IaaS system, separating the management and control plane from the data plane, providing a programmable interface to network equipment, giving centralized control over network equipment without requiring physical access, etc.

The term "network function virtualization (NFV)" may be used in this application to refer to components, systems and technologies that leverage virtualization techniques to enable existing network infrastructure (both user and control plane) to be consolidated (e.g., among elements/functions within each of the user and control planes, etc.) and virtualized so that it may operate in a virtualized environment on commodity hardware or within an IaaS system.

The term "service provider" may be used in this application to refer to a network, technology or entity (e.g., network operator such a AT&T, vehicle manufacturer such as Ford, etc.) that provides consumers with access to a service (e.g., cellular subscription plan, roadside assistance, SiriusXM, etc.) or to the Internet. Examples of service provider technologies and networks include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these technologies involves, for example, the transmission and reception of data, signaling and/or content messages.

The term "external provider" may be used herein to refer to a third party (e.g., a vehicle manufacturer such as Ford, BMW, etc.) or an external service provider (e.g., network operator such a VERIZON, etc.) that provides consumers with access to services (e.g., roadside assistance, SiriusXM, etc.), and is a separate legal entity from the service provider that allocates the network resources to provide the consumer with access to the Internet or IP services.

For ease of reference, the following descriptions of various embodiments include acronyms defined in the following table.

Data Network Name (DNN)
Discontinuous Reception (DRX)
Evolved Packet System (EPS)
Extensible Authentication Protocol (EAP)
Equipment Identity Register (EIR)
Graphic Processing Unit (GPU)
Globally Unique AMF Identifier (GUAMI)
Home Public Land Mobile Network (HPLMN)
IP Multimedia Core Network Subsystem (IMS)
Internet Protocol (IP)
Local Area Data Network (LADN)
Liquid Crystal Display (LCD)
Mission Critical Services (MCX)
Mobile Initiated Connection Only (MICO)
Multimedia Priority Service (MPS)
Network Access Server (NAS)
Network Function (NF)
Next Generation Application Protocol (NGAP)
Network Repository Function (NRF)
Network Slice Selection Function (NSSF)
Network Slice Selection Policy (NSSP)
Packet Data Network (PDN)
Packet Data Unit (PDU)
Public Land Mobile Network (PLMN)
Packet Switched (PS)
Radio Access Network (RAN)
Rate Matching (RM) or Resynchronization Marker (RM)
Radio Resource Control (RRC)
Subscriber Identity Module (SIM)
Subscription Concealed Identifier (SUCI)
Subscription Permanent Identifier (SUPI)
Unified Data Repository (UDR), User Data Repository (UDR) or User-Data-Request (UDR)
User equipment (UE)
User Plane (UP) or User Plane Termination (UP)
UE Route Selection Policy (URSP)
Visited Public Land Mobile Network (VPLMN)

Network slicing is a type of virtual networking architecture in the same family as software-defined networking (SDN) and network functions virtualization (NFV) that allows for the creation of multiple virtual networks ("network slices") atop the shared physical infrastructure, commodity hardware or IaaS via the partitioning of network architectures into virtual elements.

The term "virtualized network function (VNF)" may be used in this application to refer a component, system, or network element that is configured to use virtualization techniques to implement a network function. For example, a VNF may be a software implementation of a network function that may be deployed on virtualized infrastructure (e.g., compute, storage, and network). A VNF may be included and used as part of a network function virtualization (NFV) solution.

Generally, communication networks include a plurality of nodes, systems and/or components that are each responsible for providing or implementing a specific functionality for that network. For example, 5G or New Radio (NR) networks may include a radio access network ((R)AN) component, a core access and mobility management function (AMF) component, a policy control function (PCF) component, a charging system, an enforcement component, a session management function (SMF) component, an authentication server function (AUSF) component, a unified data management (UDM) component, a user plane function (UPF) component, an authentication, authorization, and accounting (AAA) component, and an application function (AF) component. In the embodiments, any or all of these components may be implemented as virtualized network functions (VNFs).

Network slices may be identified based on network slice selection assistance information (NSSAI), which may be included in the control plane or signaling messages that are communicated between a user equipment (UE) and network components. The NSSAI may include a list or collection of single network slice selection assistance information (S-NSSAI) elements that each identify a specific instance of a network slice. An S-NSSAI may include slice/service type (SST) information element that identifies expected network slice behavior in terms of features and services, a slice differentiator (SD) information element that further differentiates between multiple network slices having the same SST, and a PLMN ID that identifies a network associated with the S-NSSAI that the UE may access. Currently, 3GPP standards support including up to eight (8)S-NSSAIs within the NSSAI. This allows a single UE to be served by up to eight network slices at a time.

In order to access network slices, the UE typically first performs a registration request procedure in which it provides a Requested NSSAI message to a core access and mobility management function (AMF) component in the network. In response, the AMF component performs various authentication operations, which may include performing certain checks based on local policies, the UE's subscriptions, information stored in the UE's SIM card, etc. The authentication operations may also include verifying the network slices that can be provided to the UE (e.g., provisioned for access and use by the UE).

If these authentication operations are successful, the AMF component (or another component) may authorize the network slices, and generate and send an Allowed NSSAI message to the UE that informs the UE of the verified network slices that the UE may access and use. In response to receiving the Allowed NSSAI message, UE may perform various PDU session establishment operations to establish a connectivity to the network slices.

The AMF component may also send a Rejected NSSAI message to the UE if the authentication (e.g., verification, authorization, etc.) fails, such as when the network slice is not supported, the AMF does not support the registration area in which the UE is currently located, etc. Due to the way the Rejected NSSAI works, a UE that receives a Rejected NSSAI message may be prevented from accessing that network slice for an extended or indefinite time period. That is, to prevent hacking and denial of service attacks on the network, the UE cannot retry the use of that S-NSSAI (i.e. attempt to re-register and add such S-NSSAI to the Requested NSSAI). This applies to the registration area (if the S-NSSAI is rejected with cause indication "RA") or the PLMN (if the S-NSSAI is rejected with cause indication "PLMN", which is the more probable scenario since the S-NSSAI failure is not RA-related).

There may be some services for which a network operator allocates their network resources, but which are ultimately provided by an external service provider. For example, an Internet-connected motor vehicle may include a subscription plan or service (roadside assistance, SiriusXM, etc.) that is provided by the manufacturer (e.g., Ford, BMW, etc.) or external service provider, and supported by the network resources allocated by the network operator (e.g., AT&T). For these services, the network operator (e.g., AT&T) may or may not have direct access to the billing, payment or subscription information required to determine whether the UE may access or use the network slice associated with the services. Rather, such information is often only accessible to a AAA server of the external service provider (i.e., a AAA-S) that is ultimately responsible for the service.

For such services, in addition to the "primary" authentication operations by the mobile network operator in which the AMF ensures that the services and network slices are supported by the network, the AMF may be required to perform slice specific secondary authentication (SSSA) operations to ensure that access and use of the requested network slice is permitted by the external service provider or third party.

Thus, some S-NSSAIs in the Requested NSSAI may be subject to slice specific secondary authentication (SSSA), and may need to be authenticated and/or authorized by a AAA server of the service provider that provides the slice-specific services to the UE. Since the SSSA operations may be more time consuming than the primary authentication operations, the AMF may determine whether SSSA is required for any of the S-NSSAIs, and send an Allowed NSSAI message to the UE for only the verified network slices that do not require SSSA.

The AMF may initiate the SSSA procedure for the verified network slices that are determined to require SSSA, and inform the UE that the request is pending secondary authentication (e.g., by sending a N2 message that includes Registration Accept and Pending Slice-Specific Secondary Authentication data fields). When the SSSA procedure is complete, the AMF may send the UE a new Allowed NSSAI message that identifies the previously allowed network slices (that do not require SSSA and are authorized by the mobile network operator based on subscription information and AMF local policies) and the newly allowed network slices (which are authorized by the mobile network operator based on subscription information and AMF local policies, and for which the SSSA procedure was successful).

There are currently no clear standards for addressing situations in which the SSSA procedure fails for an S-NSSAI. Since the user may later fix the authorization issues (e.g. pay the bill the with service provider, fix the subscription with the service provider, etc.), adding the S-NSSAI to the Rejected NSSAI when the SSSA procedure fails is problematic. This is because, due to security concerns, the UE cannot retry the use of a S-NSSAI (i.e. attempt to re-register and add such S-NSSAI to the Requested NSSAI) after it has been added to the Rejected NSSAI. This applies to the registration area (if the S-NSSAI is rejected with cause indication "RA") or the PLMN (if the S-NSSAI is rejected with cause indication "PLMN", which is the more probable scenario since the S-NSSAI failure is not RA-related).

In addition, the authentication process is always newly initiated by authenticator (e.g., the network operator associated with the AMF, etc.). When an authentication is successful, the system generates and maintains state information that associates the AMF with the AAA server of the external service provider (AAA-S). This association may be used to later re-authenticate the previous authentication, revoke the authentication, etc. However, when the SSSA procedure fails (network slice is rejected), the system does not maintain any state information that could be used to identify the association between the AMF and the AAA-S server. If the conditions that caused the SSSA procedure to fail are mitigated (i.e., the user later fixs the authorization issue, pays the bill, etc.), using existing technologies, re-authentication cannot be triggered by the AAA-S because there is no valid association between the AAA-S and the AMF.

To address these and other issues, the various embodiments include components (e.g., UE, AMF, etc.) that are configured to generate and use an Unauthorized network slice selection assistance information (NSSAI) information element (IE) that identifies the allowed/verified S-NSSAIs for which the SSSA procedure failed. That is, when the components perform the registration operations and generate the Allowed NSSAI IE, they may also generate and send to the UE an "Unauthorized NSSAI" (or "Pending NSSAI") IE that includes a list of all the NSSAIs that are subject to authentication (or further authentication, re-authentication, etc.). That is, the Pending NSSAI IE sent by the AMF may inform the UE about S-NSSAI(s) for which the network slice-specific authentication and authorization procedure is pending.

In some embodiments, upon performing SSSA for all S-NSSAIs requiring it, a network server (e.g., AMF) may perform a UE Configuration Update Procedure and send to the UE a new Allowed NSSAI (adding the S-NSSAIs for which SSSA succeeded), an Unauthorized NSSAI containing the allowed/verified S-NSSAIs for which the SSSA procedure failed, and a Rejected NSSAI for allowed/verified S-NSSAIs for which the SSSA procedure failed a number of times. The AMF may also provide an Unauthorized S-NSSAI Backoff Timer for an allowed/verified S-NSSAIs for which the SSSA procedure failed a number of times.

The UE processor may be configured to determine, either periodically or in response to an attempt to use a network slice, whether the S-NSSAI in the Unauthorized NSSAI has been authorized. In response to determining that an S-NSSAI in the Unauthorized NSSAI has been authorized (e.g., the user paid the bill with the provider authorizing the S-NSSAI), the UE may perform a registration procedure and include any of the S-NSSAIs in the Unauthorized NSSAI in the Requested NSSAI. To protect the network from continuous unauthorized attempts, the network server (e.g., AMF) may be configured to place a S-NSSAI in the Rejected NSSAI for a registration area in response to determining that the UE has repeatedly reattempted registration for an S-NSSAI included the Unauthorized NSSAI, and the SSSA for that S-NSSAI keeps failing.

The Subscription Information may contain one or more S-NSSAIs, i.e. Subscribed S-NSSAIs. Based on operator's policy, one or more Subscribed S-NSSAIs can be marked as a default S-NSSAI. If an S-NSSAI is marked as default, then the network is expected to serve the UE with a related applicable network slice instance when the UE does not send any valid S-NSSAI to the network in a Registration Request message as part of the Requested NSSAI.

The network (e.g., AMF, etc.) may verify the Requested NSSAI that the UE provides in the Registration Request against the Subscription Information. The Subscription Information for each S-NSSAI may contain a Subscribed DNN list and one default DNN, and an indication whether the S-NSSAI is subject to Network Slice-Specific Secondary authentication and authorization.

In a roaming case, the UDM may provide to the VPLMN only the S-NSSAIs from the Subscribed S-NSSAIs the HPLMN allows for the UE in the VPLMN. When the UDM updates the Subscribed S-NSSAI(s) to the serving AMF, based on configuration in this AMF, the AMF itself or the NSSF determines the mapping of the Configured NSSAI for the Serving PLMN and/or Allowed NSSAI to the Subscribed S-NSSAI(s). The serving AMF then updates the UE with the above information.

A Generic Public Subscription Identifier (GPSI) may be used for addressing a 3GPP subscription in different data networks outside of the 3GPP system. The 3GPP system stores within the subscription data the association between the GPSI and the corresponding SUPI. GPSIs are public identifiers used both inside and outside of the 3GPP system. The GPSI may be an MSISDN or an External Identifier. If MSISDN is included in the subscription data, it may be possible that the same MSISDN value is supported in both 5GS and EPS. A GPSI may be allocated to a UE whose Subscription Information contains an indication that at least one S-NSSAI is subject to Network Slice-Specific Secondary authentication and authorization.

It should be noted that there is no implied 1-to-1 relationship between GPSI and SUPI.

When a UE registers over an Access Type with a PLMN, if the UE for this PLMN has a Configured NSSAI for this PLMN and the Access Type has an Allowed NSSAI, the UE may provide to the network in AS layer and NAS layer a Requested NSSAI containing the S-NSSAI(s) corresponding to the slice(s) to which the UE wishes to register, in addition to the 5G-S-TMSI if one was assigned to the UE. The Requested NSSAI may be one of: the Configured-NSSAI, or a subset thereof as described below (e.g., if the UE has no Allowed NSSAI for the Access Type for the serving PLMN); the Allowed-NSSAI for the Access Type over which the Requested NSSAI is sent, or a subset thereof; the Allowed-NSSAI for the Access Type over which the Requested NSSAI is sent, or a subset thereof, plus one or more S-NSSAIs from the Configured-NSSAI not yet in the Allowed NSSAI for the Access Type as described below; or the Allowed-NSSAI for the Access Type over which the Requested NSSAI is sent, or a subset thereof, plus one or more S-NSSAIs from the Unauthorized NSSAI.

If the UE processor is performing operations to register only a subset of the S-NSSAIs from the Configured NSSAI or the Allowed NSSAI, to be able to register with some Network Slices (e.g., to establish PDU Sessions for some application(s)) and the UE has NSSP in the URSP, then the UE processor uses the NSSP in the URSP to ensure that the S-NSSAIs included in the Requested NSSAI are not in conflict with the NSSP in the URSP.

The subset of S-NSSAIs in the Configured-NSSAI provided in the Requested NSSAI consists of one or more S-NSSAI(s) in the Configured NSSAI applicable to this PLMN, if one is present, and for which no corresponding S-NSSAI is already present in the Allowed NSSAI for the access type for this PLMN. The UE processor may not include in the Requested NSSAI any S-NSSAI that is currently rejected by the network (i.e. rejected in the current registration area or rejected in the PLMN). For the registration to a PLMN for which neither a Configured NSSAI applicable to this PLMN or an Allowed NSSAI are present, the S-NSSAIs provided in the Requested NSSAI correspond to the S-NSSAI(s) in the Default Configured NSSAI.

The UE processor includes in the Requested NSSAI one or more S-NSSAIs from the Unauthorized NSSAI when the UE, based on implementation dependent mechanisms, determines that the S-NSSAI can be authorized.

When a UE processor registers over an Access Type with a PLMN, the UE processor may also indicate in the Registration Request message when the Requested NSSAI is based on the Default Configured NSSAI.

The UE processor may include the Requested NSSAI in the RRC Connection Establishment and in the establishment of the connection to the N3IWF (as applicable) and in the NAS Registration procedure messages. However, the UE processor may not indicate any NSSAI in RRC Connection Establishment or Initial NAS message unless it has either a Configured NSSAI for the corresponding PLMN, an Allowed NSSAI for the corresponding PLMN and Access Type, or the Default Configured NSSAI. The (R)AN may route the NAS signaling between this UE and an AMF selected using the Requested NSSAI obtained during RRC Connection Establishment or connection to N3IWF respectively. If the (R)AN is unable to select an AMF based on the Requested NSSAI, the (R)AN routes the NAS signaling to an AMF from a set of default AMFs. In the NAS signaling the UE processor provides the mapping of each S-NSSAI of the Requested NSSAI to a corresponding HPLMN S-NSSAI.

When a UE registers with a PLMN, if for this PLMN the UE processor has not included a Requested NSSAI nor a GUAMI while establishing the connection to the (R)AN, the (R)AN may route all NAS signaling from/to this UE to/from a default AMF. When receiving from the UE a Requested NSSAI and a 5G-S-TMSI or a GUAMI in RRC Connection Establishment or in the establishment of connection to N3IWF, if the 5G-AN can reach an AMF corresponding to the 5G-S-TMSI or GUAMI, then 5G-AN forwards the request to this AMF. Otherwise, the 5G-AN selects a suitable AMF based on the Requested NSSAI provided by the UE and forwards the request to the selected AMF. If the 5G-AN is not able to select an AMF based on the Requested NSSAI, then the request is sent to a default AMF.

When the AMF selected by the AN receives the UE Registration request, as part of the Registration procedure, the AMF may query the UDM to retrieve UE subscription information including the Subscribed S-NSSAIs. The AMF verifies whether the S-NSSAI(s) in the Requested NSSAI are permitted based on the Subscribed S-NSSAIs (to identify the Subscribed S-NSSAIs the AMF may use the mapping to HPLMN S-NSSAIs provided by the UE, in the NAS message, for each S-NSSAI of the Requested NSSAI). When the UE context in the AMF does not yet include an Allowed NSSAI for the corresponding Access Type, the AMF queries the NSSF, except in the case when, based on configuration in this AMF, the AMF is allowed to determine whether it can serve the UE. The address of the NSSF is locally configured in the AMF.

It should be noted that the configuration in the AMF may depend on the operator's policy.

When the UE context in the AMF already includes an Allowed NSSAI for the corresponding Access Type, based on the configuration for this AMF, the AMF may be allowed to determine whether it can serve the UE.

Depending on fulfilling the configuration as described above, the AMF may be allowed to determine whether it can serve the UE, and the following is performed: AMF checks whether it can serve all the S-NSSAI(s) from the Requested NSSAI present in the Subscribed S-NSSAIs (potentially using configuration for mapping S-NSSAI values between HPLMN and Serving PLMN), or all the S-NSSAI(s) marked as default in the Subscribed S-NSSAIs in the case that no Requested NSSAI was provided or none of the S-NSSAIs in the Requested NSSAI were present in the Subscribed S-NSSAIs. If the AMF can serve the S-NSSAIs in the Requested NSSAI, the AMF remains the serving AMF for the UE. The Allowed NSSAI is then composed of the list of S-NSSAI(s) in the Requested NSSAI permitted based on the Subscribed S-NSSAIs, or, if no Requested NSSAI was provided, all the S-NSSAI(s) marked as default in the Subscribed S-NSSAIs and taking also into account the availability of the Network Slice instances as described in clause 5.15.8 that are able to serve the S-NSSAI(s) in the Allowed NSSAI in the current UE's Tracking Areas. It also determines the mapping if the S-NSSAI(s) included in the Allowed NSSAI needs to be mapped to Subscribed S-NSSAI(s) values. If no Requested NSSAI is provided, or the Requested NSSAI includes an S-NSSAI that is not valid in the Serving PLMN, or the UE indicated that the Requested NSSAI is based on the Default Configured NSSAI, the AMF, based on the Subscribed S-NSSAI(s) and operator's configuration, may also determine the Configured NSSAI for the Serving PLMN and, if applicable, the associated mapping of the Configured NSSAI to HPLMN S-NSSAIs, so these can be configured in the UE. Then Step (C) is executed. Else, the AMF queries the NSSF (see (B) below).

When required as described above, the AMF needs to query the NSSF and the following is performed: The AMF queries the NSSF, with Requested NSSAI, Default Configured NSSAI Indication, mapping of Requested NSSAI to HPLMN S-NSSAIs, the Subscribed S-NSSAIs (with an indication if marked as default S-NSSAI), any Allowed NSSAI it might have for the other Access Type (including its mapping to HPLMN S-NSSAIs), PLMN ID of the SUPI and UE's current Tracking Area(s).

It should be noted that when more than one UE's Tracking Area is indicated, the UE is using more than one Access Type.

Based on this information, local configuration, and other locally available information including RAN capabilities in the current Tracking Area for the UE or load level information for a network slice instance provided by the NWDAF, the NSSF does the following. The NSSF verifies which S-NSSAI(s) in the Requested NSSAI are permitted based on comparing the Subscribed S-NSSAIs with the S-NSSAIs in the mapping of Requested NSSAI to HPLMN S-NSSAIs. The NSSF considers the S-NSSAI(s) marked as default in the Subscribed S-NSSAIs in the case that no S-NSSAI from the Requested NSSAI are present in the Subscribed S-NSSAIs. The NSSF selects the Network Slice instance(s) to serve the UE. When multiple Network Slice instances in the UE's Tracking Areas are able to serve a given S-NSSAI, based on operator's configuration, the NSSF may select one of them to serve the UE, or the NSSF may defer the selection of the Network Slice instance until a NF/service within the Network Slice instance needs to be selected. The NSSF determines the target AMF Set to be used to serve the UE, or, based on configuration, the list of candidate AMF(s), possibly after querying the NRF.

It should be noted that if the target AMF(s) returned from the NSSF is the list of candidate AMF(s), the Registration Request message can only be redirected via the direct signaling between the initial AMF and the selected target AMF.

The NSSF determines the Allowed NSSAI(s) for the applicable Access Type(s), composed of the list of S-NSSAI(s) in the Requested NSSAI permitted based on the Subscribed S-NSSAIs, or, if no Requested NSSAI was provided, all the S-NSSAI(s) marked as default in the Subscribed S-NSSAIs, and taking also into account the availability of the Network Slice instances that are able to serve the S-NSSAI(s) in the Allowed NSSAI in the current UE's Tracking Areas. The NSSF also determines the mapping of each S-NSSAI of the Allowed NSSAI(s) to the Subscribed S-NSSAIs if necessary. Based on operator configuration, the NSSF may determine the NRF(s) to be used to select NFs/services within the selected Network Slice instance(s).

Additional processing may be performed to determine the Allowed NSSAI(s) in roaming scenarios and the mapping to the Subscribed S-NSSAIs. If no Requested NSSAI is provided or the Requested NSSAI includes an S-NSSAI that is not valid in the Serving PLMN or the Default Configured NSSAI Indication is received from AMF, the NSSF based on the Subscribed S-NSSAI(s) and operator configuration may also determine the Configured NSSAI for the Serving PLMN and, if applicable, the associated mapping of the Configured NSSAI to HPLMN S-NSSAIs, so these can be configured in the UE. The NSSF returns to the current AMF the Allowed NSSAI for the applicable Access Type(s), the mapping of each S-NSSAI of the Allowed NSSAI to the Subscribed S-NSSAIs if determined and the target AMF Set, or, based on configuration, the list of candidate AMF(s). The NSSF may return the NRF(s) to be used to select NFs/services within the selected Network Slice instance(s), and the NRF to be used to determine the list of candidate AMF(s) from the AMF Set. The NSSF may return NSI ID(s) to be associated to the Network Slice instance(s) corresponding to certain S-NSSAIs. NSSF may return the rejected S-NSSAI(s). The NSSF may return the Configured NSSAI for the Serving PLMN and the associated mapping of the Configured NSSAI to HPLMN S-NSSAIs. Depending on the available information and based on configuration, the AMF may query the appropriate NRF (e.g. locally preconfigured or provided by the NSSF) with the target AMF Set. The NRF returns a list of candidate AMFs. If rerouting to a target serving AMF is necessary, the current AMF reroutes the Registration Request to a target serving AMF.

The serving AMF may determine a Registration Area such that all S-NSSAIs of the Allowed NSSAI for this Registration Area are available in all Tracking Areas of the Registration Area (and also considering other aspects) and then return to the UE this Allowed NSSAI and the mapping of the Allowed NSSAI to the Subscribed S-NSSAIs if provided. The AMF may return the rejected S-NSSAI(s).

It should be noted that, as there is a single distinct Registration Area for Non-3GPP access in a PLMN, the S-NSSAIs in the Allowed NSSAI for this Registration Area (i.e. for Non-3GPP access) are available homogeneously in the PLMN.

When either no Requested NSSAI was included, or the mapping of the S-NSSAIs in Requested NSSAI to HPLMN S-NSSAIs is incorrect, or a Requested NSSAI is not considered valid in the PLMN and as such at least one S-NSSAI in the Requested NSSAI was rejected as not usable by the UE in the PLMN, or the UE indicated that the Requested NSSAI is based on the Default Configured NSSAI, the AMF may update the UE slice configuration information for the PLMN.

If a Requested NSSAI includes S-NSSAIs which map to S-NSSAIs of the HPLMN subject to Network Slice-Specific Secondary authentication and authorization, the AMF may indicate in the Allowed NSSAI only those S-NSSAIs that are not subject to Network Slice-Specific Secondary authentication and authorization, and may indicate to the UE that Slice-Specific Secondary authentication will be executed. Then, the AMF may initiate the Network Slice-Specific Secondary authentication and authorization procedure for each S-NSSAI that requires it. At the end of the Network Slice-Specific Secondary authentication and authorization steps, the UE may obtain a new Allowed NSSAI which also contains the S-NSSAIs subject to Network Slice-Specific Secondary authentication and authorization, and for which the authentication and authorization is successful. If an AMF change is required, this may be triggered by the AMF using a UE Configuration Update procedure indicating a UE re-registration is required. The UE may also obtain an Unauthorized NSSAI containing the S-NSSAI subject to Network Slice-Specific Secondary authentication and authorization, and for which Network Slice-Specific Secondary authentication and authorization has failed.

If a Requested NSSAI includes only S-NSSAIs which map to S-NSSAIs of the HPLMN subject to Network Slice-Specific Secondary authentication and authorization, and the Network Slice-Specific Secondary authentication and authorization fails for all the S-NSSAIs in the Requested NSSAI, the UE obtains no Allowed NSSAI.

A serving PLMN may perform Network Slice-Specific Secondary authentication and authorization for the S-NSSAIs of the HPLMN which are subject to it based on subscription information.

To perform the Network Slice-Specific Secondary authentication and authorization for a S-NSSAI, the AMF invokes an EAP-based Network Slice-Specific Secondary authorization procedure for the S-NSSAI. This procedure can be invoked by an AMF at any time, such as when the UE registers with the AMF and one of the S-NSSAIs of the HPLMN which maps to a S-NSSAI in the Requested NSSAI is requiring Network Slice-Specific Secondary authentication and authorization, or the Network Slice-Specific AAA Server triggers a UE re-authentication and authorization for a S-NSSAI, or the AMF, based on operator policy or a subscription change, decides to initiate the Network Slice-Specific Secondary authentication and authorization procedure for certain S-NSSAI which was previously authorized.

After a successful or unsuccessful UE Network Slice-Specific Secondary authentication and authorization, the UE context in the AMF may retain the authentication and authorization status for the UE for the related specific S-NSSAI of the HPLMN until the UE remains RM-REGISTERED in the PLMN, so that the AMF does not execute a Network Slice-Specific Secondary authentication and authorization for a UE at every Registration procedure with the PLMN.

A Network Slice-Specific AAA server may revoke the authorization or challenge the authentication and authorization of a UE at any time. When authorization is revoked for an S-NSSAI that is in the current Allowed NSSAI, the AMF may provide a new Allowed NSSAI to the UE and trigger the release of all PDU sessions associated with the S-NSSAI.

The AMF provides the GPSI of the UE to the AAA Server to allow the AAA server to initiate the Network Slice-Specific Secondary authentication and authorization, or the Authorization revocation procedure, where the UE current AMF needs to be identified by the system so the UE authorization status can be challenged or revoked.

The Network Slice-Specific Secondary authentication and authorization is performed after a successful registration procedure. The Network Slice-Specific Secondary authentication and authorization requires that the UE Primary Authentication and Authorization of the SUPI has successfully completed. If the SUPI authorization is revoked, then also the Network Slice-Specific Secondary authorization is revoked.

FIG. 1 illustrates an example wireless network 100, such as a new radio (NR) or 5G network, in which aspects of the present disclosure may be performed. For example, the system in a package (SIP) 200 illustrated in FIG. 2 may include a 5G modem processor that is configured to send and receive information via the wireless network 100. As another example, the smartphone illustrated in FIG. 10 may send and receive information via the wireless network 100.

In the example illustrated in FIG. 1, the wireless network 100 includes a number of base stations 110 and other network entities. A base station may be a station that communicates with user equipment devices. Each base station 110 may provide communication coverage for a particular geographic area. In 3GPP, the term "cell" can refer to a coverage area of a Node B and/or a Node B subsystem serving this coverage area, depending on the context in which the term is used. In new radio (NR) or 5G network systems, the term "cell" and eNB, Node B, 5G NB, AP, NR base station, NR base station, or transmission and reception point (TRP) may be interchangeable. In some examples, a cell may or may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station may provide communication coverage for a macro cell, a pico cell, a femto cell, and/or other types of cell. A macro cell may cover a relatively large geographic area (e.g., several kilometers in radius) and may allow unrestricted access by user equipment devices with service subscription. A pico cell may cover a relatively small geographic area and may allow unrestricted access by user equipment devices with service subscription. A femto cell may cover a relatively small geographic area (e.g., a home) and may allow restricted access by user equipment devices having association with the femto cell (e.g., user equipment devices in a Closed Subscriber Group (CSG), user equipment devices for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells.

The wireless network 100 may also include relay stations. A relay station is a station that receives a transmission of data and/or other information from an upstream station (e.g., a base station or a user equipment device) and may send a transmission of the data and/or other information to a downstream station (e.g., a user equipment device or a base station). A relay station may also be a user equipment device that relays transmissions for other user equipment devices. In the example shown in FIG. 1, a relay station 110r may communicate with the base station 110a and a user equipment device 120r in order to facilitate communication between the base station 110a and the user equipment device 120r. A relay station may also be referred to as a relay base station, a relay, etc.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may or may not be aligned in time. The techniques described herein may be used for both synchronous and asynchronous operations.

A network controller 130 may be coupled to a set of base stations and provide coordination and control for these base stations. The network controller 130 may communicate with the base stations 110 via a backhaul. The base stations 110 may also communicate with one another, e.g., directly or indirectly via wireless or wireline backhaul.

The user equipment (UE) devices 120 (e.g., 120x, 120y, etc.) may be dispersed throughout the wireless network 100, and each user equipment device may be stationary or mobile. Some user equipment devices may be considered evolved or machine-type communication (MTC) devices or evolved MTC (eMTC) devices. MTC and eMTC user equipment devices include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network)

via a wired or wireless communication link. Some user equipment devices may be considered Internet-of-Things (IoT) devices.

In FIG. 1, a solid line with double arrows may indicate desired transmissions between a user equipment device and a serving base station, which is a base station designated to serve the user equipment device on the downlink and/or uplink. A dashed line with double arrows may indicate interfering transmissions between a user equipment device and a base station.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. NR base stations may transmit downlink signals to user equipment devices indicating the cell type. Based on the cell type indication, the user equipment device may communicate with the NR base station. For example, the user equipment device may determine NR base stations to consider for cell selection, access, handover (HO), and/or measurement based on the indicated cell type.

Figure 2:
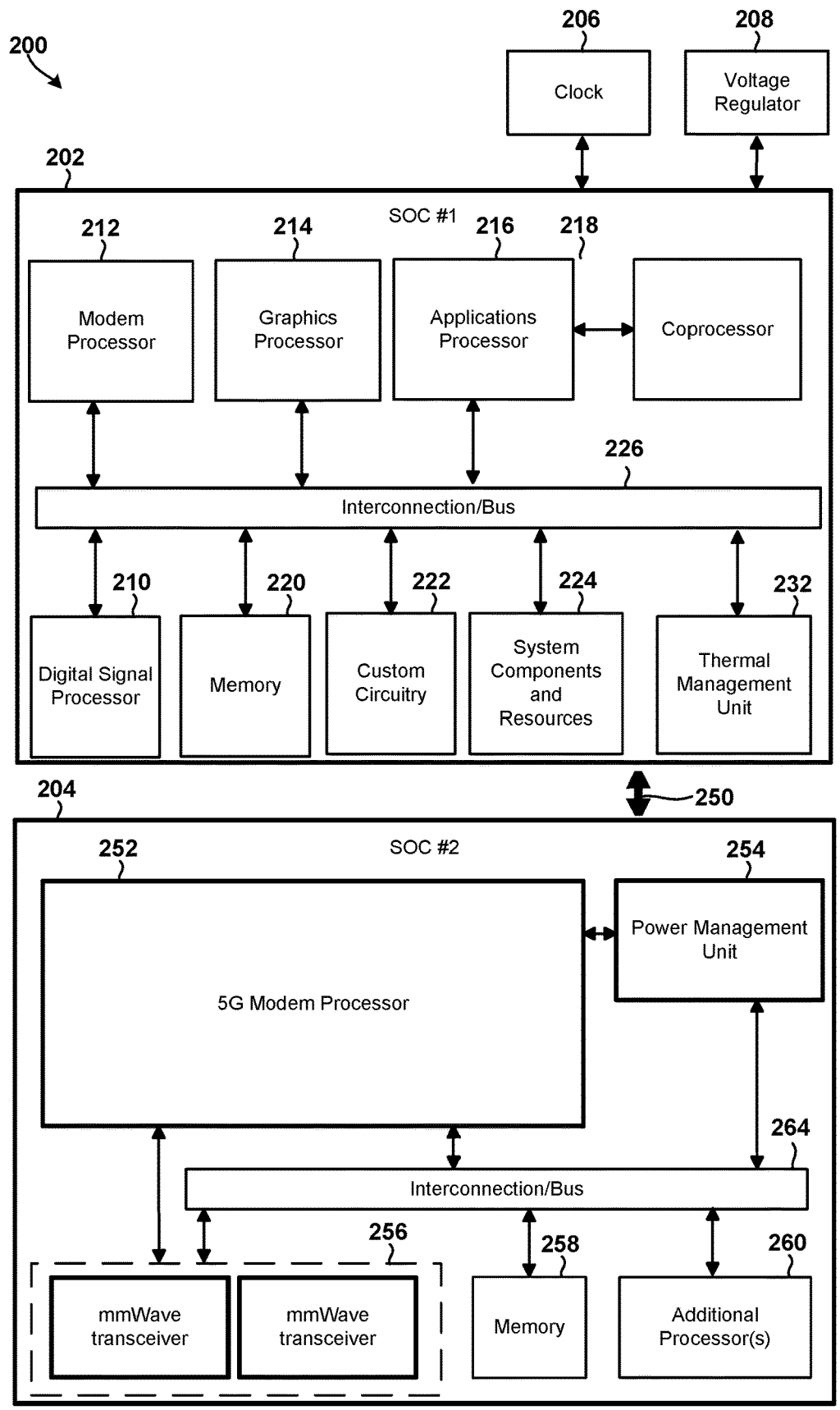
FIG. 2 is a component block diagram illustrating a computing system that may be configured to support device triggered re-authentication of slice-specific secondary authentication and authorization in accordance with various aspects of the present disclosure.

The various aspects may be implemented on a number of single processor and multiprocessor computer systems, including an SOC or SIP. FIG. 2 illustrates an example computing system or SIP 200 architecture that may be used in user equipment or user equipment devices (e.g., the smartphone illustrated in FIG. 10) implementing the various aspects.

In the example illustrated in FIG. 2, the SIP 200 includes a two SOCs 202, 204, a clock 206, and a voltage regulator 208. In some aspects, the first SOC 202 operate as central processing unit (CPU) of the user equipment device that carries out the instructions of software application programs by performing the arithmetic, logical, control and input/output (I/O) operations specified by the instructions. In some aspects, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 2, the first SOC 202 includes a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, and a thermal management unit 232. The second SOC 204 includes a 5G modem processor 252, a power management unit 254, an interconnection/bus module 264, a plurality of mmWave transceivers 256, memory 258, and various additional processors 260, such as an applications processor, packet processor, etc.

The thermal management unit 232 may be configured to monitor and manage the user equipment devices surface/skin temperatures and/or the ongoing consumption of power by the active components that generate thermal energy in the user equipment device. The thermal management unit 232 may intelligently and dynamically determine whether to throttle the performance of active processing components (e.g., CPU, GPU, LCD brightness), the processors that should be throttled, the level to which the frequency of the processors should be throttled, when the throttling should occur, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10, etc.). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a user equipment device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processors may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the SIP 200 discussed above, the various aspects may be implemented in a wide variety of computing systems, which may include a single processor, multiple processors, multicore processors, or any combination thereof.

Figure 3:
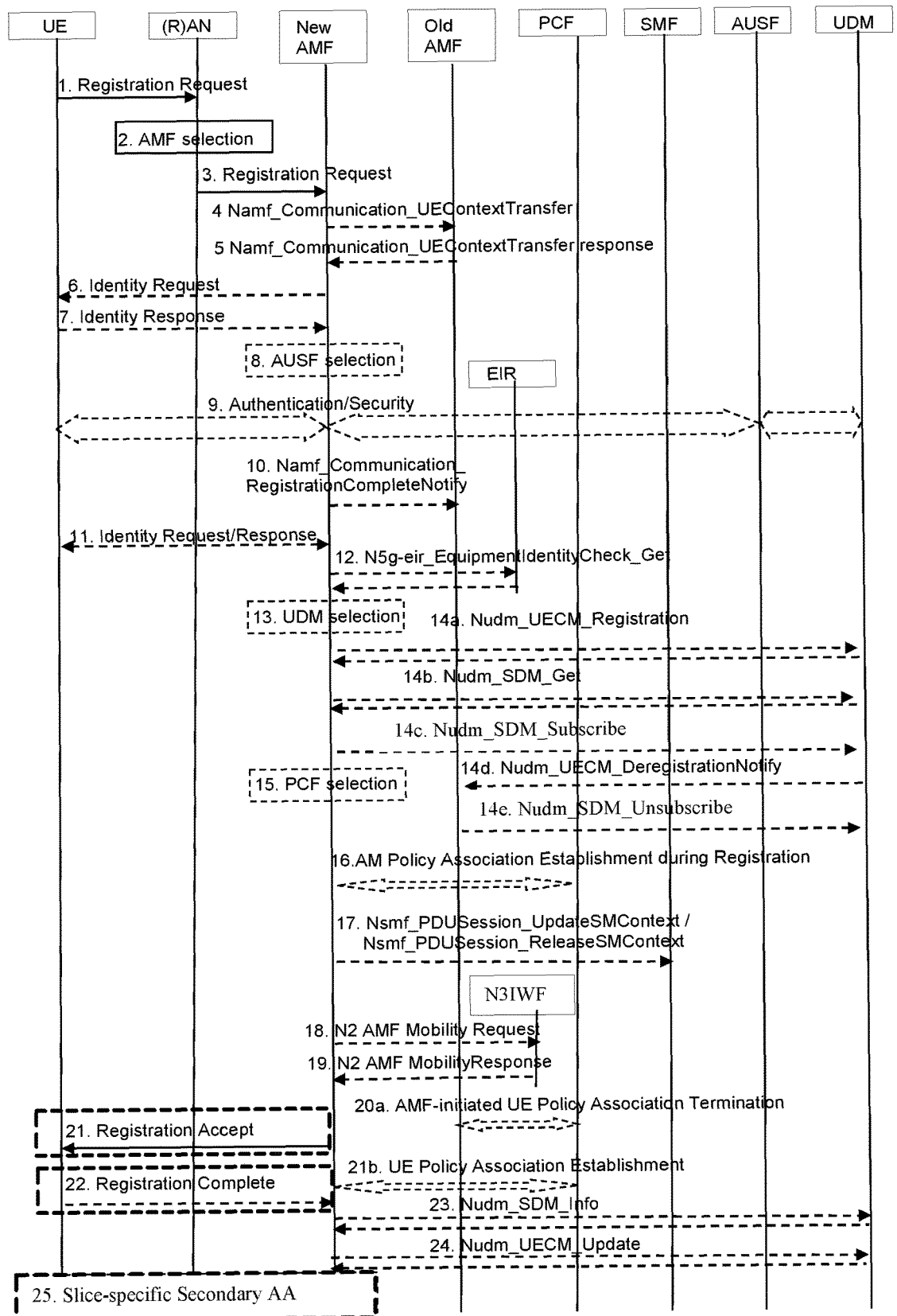
FIG. 3 is call flow diagram illustrating operations and communications between components in a communication system configured to preform registration so as to support network slicing in accordance with the various embodiments.

FIG. 3 illustrates a method 300 for performing a registration procedure in a communication system (e.g., wireless network 100 illustrated in FIG. 1, etc.) that may be configured to support network slicing in accordance with the various embodiments. In the example illustrated in FIG. 3, the method 300 is performed in a communication system that includes a user equipment (UE) device, a (R)AN component, a new AMF component, an old AMF component, an EIR component, a N3IWF component, a PCF component, an SMF component, an AUSF component, and a UDM component.

In operation 1, the UE may send to the (R)AN component an AN message and UE Policy Container. The AN message may include AN parameters, a Registration Request (Registration type, SUCI or 5G-GUTI or PEI, last visited TAI (if available), Security parameters, Requested NSSAI, Mapping Of Requested NSSAI, Default Configured NSSAI Indication, UE Radio Capability Update, UE MM Core network Capability, PDU Session status, List Of PDU Sessions To Be Activated, Follow-on request, MICO mode preference, Requested DRX parameters, LADN DNN(s) and/or Indicator Of Requesting LADN Information. The UE Policy Container may include a list of PSIs, indication of UE support for ANDSP, and/or an operating system identifier.

In the case of NG-RAN, the AN parameters may include, for example, a 5G-S-TMSI or GUAMI, the Selected PLMN ID and Requested NSSAI, and/or an Establishment cause that provides a reason for requesting the establishment of an RRC connection. The Registration type may indicate whether the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry), or an Emergency Registration (i.e. the UE is in limited service state).

When the UE is performing an Initial Registration, the UE may indicate its UE identity in the Registration Request message. If the UE was previously registered in EPS and has a valid EPS GUTI, the Registration Request message may include a 5G-GUTI, a native 5G-GUTI assigned by the which the UE is attempting to register, a native 5G-GUTI assigned by an equivalent PLMN to the PLMN to which the UE is attempting to register, and/or a native 5G-GUTI assigned by any other PLMN (which may also be a 5G-GUTIs assigned via another access type). Otherwise, the Registration Request message may include the SUCI in the Registration Request.

If the UE has a NAS security context, the UE may include in the Security parameters an indication that the NAS message is integrity protected and partially ciphered to indicate to the AMF how to process the enclosed parameters. If the UE has no NAS security context, the Registration Request message may simply contain cleartext IEs.

When the UE is performing an Initial Registration (i.e., the UE is in RM-DEREGISTERED state) with a native 5G-GUTI, then the UE may indicate the related GUAMI information in the AN parameters. When the UE is performing an Initial Registration with its SUCI, the UE may or may not indicate any GUAMI information in the AN parameters.

For an Emergency Registration, the SUCI may be included if the UE does not have a valid 5G-GUTI available; the PEI may be included when the UE has no SUPI and no valid 5G-GUTI. In other cases, the 5G-GUTI may be included and it may indicate the last serving AMF.

The UE may provide the UE's usage setting based on its configuration. In case of Initial Registration or Mobility Registration Update, the UE may include the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE may include the Default Configured NSSAI Indication if the UE is using a Default Configured NSSAI In the case of a Mobility Registration Update, the UE may include in the List Of PDU Sessions To Be Activated the PDU Sessions for which there are pending uplink data. When the UE may include the List Of PDU Sessions To Be Activated, the UE may indicate PDU Sessions only associated with the access the Registration Request is related to. The UE may include always-on PDU Sessions which are accepted by the network in the List Of PDU Sessions To Be Activated even if there are no pending uplink data for those PDU Sessions.

It should be noted that a PDU Session corresponding to a LADN is not included in the List Of PDU Sessions To Be Activated when the UE is outside the area of availability of the LADN.

The UE MM Core network Capability may be provided by the UE and handled by AMF. The UE may include in the UE MM Core network Capability an indication if it supports Request Type flag "handover" for PDN connectivity request during the attach procedure.

The UE may provide either the LADN DNN(s) or an Indication Of Requesting LADN Information.

If available, the last visited TAI may be included in order to help the AMF produce Registration Area for the UE.

The Security parameters may be used for Authentication and integrity protection. Requested NSSAI may indicate the network Slice Selection Assistance Information. The PDU Session status may indicate the previously established PDU Sessions in the UE. When the UE is connected to the two AMFs belonging to different PLMN via 3GPP access and non-3GPP access then the PDU Session status may indicate the established PDU Session of the current PLMN in the UE.

The Follow-on request may be included when the UE has pending uplink signaling and the UE doesn't include List Of PDU Sessions To Be Activated, or the Registration type may indicate the UE wants to perform an Emergency Registration. In Initial Registration and Mobility Registration Update, UE may provide the UE Requested DRX parameters.

The UE may provide UE Radio Capability Update indication.

The UE access selection and PDU session selection may identify the list of UE access selection and PDU session selection policy information stored in the UE. They may be used by the PCF to determine if the UE has to be updated with new PSIs or if some of the stored ones are no longer applicable and have to be removed.

In operation 2, the (R)AN may select an AMF component. If a 5G-S-TMSI or GUAMI is not included or the 5G-S-TMSI or GUAMI does not indicate a valid AMF, the (R)AN, based on (R)AT and Requested NSSAI, if available, selects an AMF.

The (R)AN selects an AMF. If the UE is in CM-CONNECTED state, the (R)AN could forward the Registration Request message to the AMF based on the N2 connection of the UE. If the (R)AN cannot select an appropriate AMF, it may forward the Registration Request to an AMF which has been configured, in (R)AN, to perform AMF selection.

In operation 3, the (R)AN may send an N2 message or registration request to the new AMF. The N2 message may include N2 parameters, Registration Request and UE Policy Container. When NG-RAN is used, the N2 parameters may include the Selected PLMN ID, Location Information and Cell Identity related to the cell in which the UE is camping, UE Context Request which may indicate that a UE context including security information needs to be setup at the NG-RAN. When NG-RAN is used, the N2 parameters also include the Establishment cause. The Mapping Of Requested NSSAI may be provided (if available). If the UE Registration type indicated by the UE is Periodic Registration Update, then operations 4 to 19 may be omitted. When the Establishment cause is associated with priority services (e.g. MPS, MCS), the AMF may include a Message Priority header to indicate priority information. Other NFs may relay the priority information by including the Message Priority header in service-based interfaces.

In operation 4, the new AMF may send a Namf_Communication_UEContextTransfer message to the old AMF. The Namf_Communication_UEContextTransfer may include complete Registration Request. The new AMF may also send a Nudsf_Unstructured Data Management_Query( ) message to a UDSF (if deployed).

With UDSF Deployment, if the UE's 5G-GUTI was included in the Registration Request and the serving AMF has changed since last Registration procedure, new AMF and old AMF are in the same AMF Set and UDSF is deployed, the new AMF retrieves the stored UE's SUPI and UE context directly from the UDSF using Nudsf_UnstructuredDataManagement_Query service operation or they can share stored UE context via implementation specific means if UDSF is not deployed. This may include event subscription information by each NF consumer for the given UE. In this case, the new AMF uses integrity protected complete Registration request NAS message to perform and verify integrity protection.

Without UDSF Deployment, if the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, as well as the Access Type, to request the UE's SUPI and UE Context. In this case, the old AMF uses either 5G-GUTI and the integrity protected complete Registration request NAS message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF.

If the old AMF has PDU Sessions for another access type (different from the Access Type indicated in this operations) and if the old AMF determines that there is no possibility for relocating the N2 interface to the new AMF, the old AMF returns UE's SUPI and may indicate that the Registration Request has been validated for integrity protection, but does not include the rest of the UE context.

It should be noted that the new AMF sets the indication that the UE is validated according to operations 9a, in case the new AMF has performed successful UE authentication after previous integrity check failure in the old AMF. It should also be noted that the NF consumers do not need to subscribe for the events once again with the new AMF after the UE is successfully registered with the new AMF.

If the new AMF has already received UE contexts from the old AMF during handover procedure, then operations 4, 5 and 10 may be skipped.

For an Emergency Registration, if the UE identifies itself with a 5G-GUTI that is not known to the AMF, operations 4 and 5 are skipped and the AMF immediately requests the SUPI from the UE. If the UE identifies itself with PEI, the SUPI request may be skipped. Allowing Emergency Registration without a user identity is dependent on local regulations.

In operation 5 (old AMF to new AMF: Response to Namf_Communication_UEContextTransfer (SUPI, UE Context in AMF) or UDSF to new AMF: Nudsf_Unstructured Data Management_Query( )), the old AMF may start an implementation specific (guard) timer for the UE context.

If the UDSF was queried in operation 4, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP UE-TNLA bindings to N3IWF, the old AMF includes information about the NGAP UE-TNLA bindings. If the Old AMF was queried in operation 4, Old AMF responds to the new AMF for the Namf_Communication_UEContextTransfer invocation by including the UE's SUPI and UE Context.

If old AMF holds information about established PDU Session(s), the old AMF includes SMF information, DNN(s), S-NSSAI(s) and PDU Session ID(s).

If old AMF holds information about active NGAP UE-TNLA bindings to N3IWF, the old AMF includes information about the NGAP UE-TNLA bindings.

If old AMF fails the integrity check of the Registration Request NAS message, the old AMF may indicate the integrity check failure.

If old AMF holds information about AM Policy Association, the old AMF includes the information about the AM Policy Association including the policy control request trigger and PCF ID. In the roaming case, V-PCF ID and H-PCF ID are included.

It should be noted that when new AMF uses UDSF for context retrieval, interactions between old AMF, new AMF and UDSF due to UE signaling on old AMF at the same time is implementation issue.

In operation 6, new AMF to UE: Identity Request ( ), if the SUCI is not provided by the UE nor retrieved from the old AMF the Identity Request procedure is initiated by AMF sending an Identity Request message to the UE requesting the SUCI.

In operation 7: UE to new AMF: Identity Response ( ), the UE responds with an Identity Response message including the SUCI. The UE derives the SUCI by using the provisioned public key of the HPLMN.

In operation 8, the AMF may decide to initiate UE authentication by invoking an AUSF. In that case, the AMF selects an AUSF based on SUPI or SUCI. If the AMF is configured to support Emergency Registration for unauthenticated SUPIs and the UE indicated Registration type Emergency Registration, the AMF skips the authentication or the AMF accepts that the authentication may fail and continues the Registration procedure.

In operation 9a, if authentication is required, the AMF may request it from the AUSF; or if Tracing Requirements about the UE are available at the AMF, the AMF provides Tracing Requirements in its request to AUSF. Upon request from the AMF, the AUSF may execute authentication of the UE. The AUSF selects a UDM and gets the authentication data from UDM.

Once the UE has been authenticated the AUSF provides relevant security related information to the AMF. In case the AMF provided a SUCI to AUSF, the AUSF may return the SUPI to AMF only after the authentication is successful.

After successful authentication in new AMF, which is triggered by the integrity check failure in old AMF in operations 5, the new AMF invokes operation 4 above again and may indicate that the UE is validated (i.e. through the reason parameter).

In operation 9b, if NAS security context does not exist, the NAS security initiation may be performed. If the UE had no NAS security context in operations 1, the UE may include the full Registration Request message.

The AMF decides if the Registration Request needs to be rerouted, where the initial AMF refers to the AMF.

In operation 9c, the AMF initiates NGAP procedure to provide the 5G-AN with security context if the 5G-AN had requested for UE Context. In addition, if Tracing Requirements about the UE are available at the AMF, the AMF provides the 5G-AN with Tracing Requirements in the NGAP procedure.

In operation 9d, the 5G-AN stores the security context and acknowledges to the AMF. The 5G-AN uses the security context to protect the messages exchanged with the UE.

In operation 10 (new AMF to old AMF: Namf_Communication_RegistrationCompleteNotify( )), if the AMF has changed the new AMF notifies the old AMF that the registration of the UE in the new AMF is completed by invoking the Namf_Communication_RegistrationCompleteNotify service operation. If the authentication/security procedure fails, then the Registration may be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF is received in the UE context transfer in operations 2 the information about the AM Policy Association including the PCF ID(s) and decides, based on local policies, not to use the PCF(s) identified by the PCF ID(s) for the AM Policy Association, then it will inform the old AMF that the AM Policy Association in the UE context is not used any longer and then the PCF selection is performed in operations 15.

In operation 11 (new AMF to UE: Identity Request/Response (PEI)), if the PEI was not provided by the UE nor retrieved from the old AMF the Identity Request procedure is initiated by AMF sending an Identity Request message to the UE to retrieve the PEI. The PEI may be transferred encrypted unless the UE performs Emergency Registration and cannot be authenticated. For an Emergency Registration, the UE may have included the PEI in the Registration Request. If so, the PEI retrieval is skipped.

In operation 12, the new AMF may initiate ME identity check by invoking the N5g-eir_EquipmentIdentityCheck_Get service operation. A PEI check may also be performed. For an Emergency Registration, if the PEI is blocked, operator policies may be used determine whether the Emergency Registration procedure continues or is stopped. If operation 14 is to be performed, the new AMF, based on the SUPI, may select a UDM, then UDM may select a UDR instance.

In operation 13, the AMF may select a UDM.

In operations 14a-c, if the AMF has changed since the last Registration procedure, or if the UE may provide a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration for the access to be registered (and subscribes to be notified when the UDM deregisters this AMF). The AMF provides the "Homogenous Support of IMS Voice over PS Sessions" indication to the UDM. The "Homogenous Support of IMS Voice over PS Sessions" indication may or may not be included unless the AMF has completed its evaluation of the support of "IMS Voice over PS Session."

It should be noted that at this point, the AMF may or may not have all the information needed to determine the setting of the IMS Voice over PS Session Supported indication for this UE. Hence the AMF can send the "Homogenous Support of IMS Voice over PS Sessions" later on in this procedure.

If the AMF does not have subscription data for the UE, the AMF retrieves the Access and Mobility Subscription data, SMF Selection Subscription data and UE context in SMF data using Nudm_SDM_Get. This may require that the UDM retrieve the information from UDR by Nudr_DM_Query. After a successful response is received, the AMF subscribes to be notified using Nudm_SDM_Subscribe when the data requested is modified, and the UDM may subscribe to UDR by Nudr_DM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" may be included in the Access and Mobility Subscription data provided to the AMF. If the UE is subscribed to MCX in the serving PLMN, "MCX priority" may be included in the Access and Mobility Subscription data provided to the AMF.

The new AMF provides the Access Type it serves for the UE to the UDM and the Access Type is set to "3GPP access." The UDM stores the associated Access Type together with the serving AMF and does not remove the AMF identity associated to the other Access Type if any. The UDM may store in UDR information provided at the AMF registration by Nudr_DM_Update. If the UE was registered in the old AMF for an access, and the old and the new AMFs are in the same PLMN, the new AMF may send a separate/independent Nudm_UECM_Registration to update UDM with Access Type set to access used in the old AMF, after the old AMF relocation is successfully completed. The new AMF may create a UE context for the UE after getting the Access and Mobility Subscription data from the UDM. The Access and Mobility Subscription data may include whether the UE is allowed to include NSSAI in the 3GPP access RRC Connection Establishment in clear text.

For an Emergency Registration in which the UE was not successfully authenticated, the AMF may or may not register with the UDM. For an Emergency Registration, the AMF may or may not check for access restrictions, regional restrictions or subscription restrictions. For an Emergency Registration, the AMF may ignore any unsuccessful registration response from UDM and continue with the Registration procedure.

In operation 14d, when the UDM stores the associated Access Type (e.g. 3GPP) together with the serving AMF as indicated in operations 14a, this operation will cause the UDM to initiate a Nudm_UECM_DeregistrationNotification to the old AMF corresponding to the same (e.g. 3GPP) access, if one exists. If the timer started in operation 5 is not running, the old AMF may remove the UE context. Otherwise, the AMF may remove UE context when the timer expires. If the serving NF removal reason indicated by the UDM is Initial Registration, then the old AMF invokes the Nsmf_PDUSession_ReleaseSMContext (SUPI, PDU Session ID) service operation towards all the associated SMF(s) of the UE to notify that the UE is deregistered from old AMF. The SMF(s) may release the PDU Session on getting this notification. If the old AMF has established a Policy Association with the PCF, and the old AMF did not transfer the PCF ID(s) to the new AMF (e.g. new AMF is in different PLMN), the old AMF performs an AMF-initiated Policy Association Termination procedure to delete the association with the PCF. In addition, if the old AMF transferred the PCF ID(s) in the UE context but the new AMF informed in operation 10 that the AM Policy Association information in the UE context will not be used, then the old AMF performs an AMF-initiated Policy Association Termination procedure to delete the association with the PCF. If the old AMF has an N2 connection for that UE (e.g. because the UE was in RRC Inactive state but has now moved to E-UTRAN or moved to an area not served by the old AMF), the old AMF may perform AN Release with a cause value that may indicate that the UE has already locally released the NG-RAN's RRC Connection.

In operation 14e, the Old AMF may unsubscribe with the UDM for subscription data using Nudm_SDM_unsubscribe.

In operation 15, if the AMF decides to initiate PCF communication, the AMF acts as follows. If the new AMF decided to contact the (V-)PCF identified by PCF ID included in UE context from the old AMF in operation 5, the AMF may contact the (V-)PCF identified by the (V-)PCF ID. If the AMF decides to perform PCF discovery and selection and the AMF selects a (V)-PCF and may select an H-PCF (for roaming scenario) and according to the V-NRF to H-NRF interaction.

In operation 16, the new AMF may perform an AM Policy Association Modification. For an Emergency Registration, this operation is skipped. If the new AMF contacts the PCF identified by the (V-)PCF ID received during inter-AMF mobility in operation 5, the new AMF may include the PCF ID(s) in the Npcf_AMPolicyControl Create operation. This indication may or may not be included by the AMF during initial registration procedure.

If the AMF notifies the Mobility Restrictions (e.g. UE location) to the PCF for adjustment, or if the PCF updates the Mobility Restrictions itself due to some conditions (e.g. application in use, time and date), the PCF may provide the updated Mobility Restrictions to the AMF. If the subscription information includes Tracing Requirements, the AMF may provide the PCF with Tracing Requirements.

In operation 17, the new AMF may send a Nsmf_PDUSession_UpdateSMContext ( ) to the SMF. For an Emergency Registered UE, this operation may be applied when the Registration Type is Mobility Registration Update. The AMF may invoke the Nsmf_PDUSession_UpdateSMContext in the following scenario(s): If the List Of PDU Sessions To Be Activated may be included in the Registration Request in operations 1, the AMF may send Nsmf_PDUSession_UpdateSMContext Request to SMF(s) associated with the PDU Session(s) in order to activate User Plane connections of these PDU Session(s). Operations from operation 5 onwards may executed to complete the User Plane connection activation without sending the RRC Inactive Assistance Information and without sending MM NAS Service Accept from the AMF to (R)AN described in operation 12. When the serving AMF has changed, the new serving AMF notifies the SMF for each PDU Session that it has taken over the responsibility of the signaling path towards the UE: the new serving AMF invokes the Nsmf_PDUSession_UpdateSMContext service operation using SMF information received from the old AMF at operation 5. It also may indicate whether the PDU Session is to be re-activated. In the case of PLMN change from V-PLMN to H-PLMN, the new serving AMF only invokes the Nsmf_PDUSession_UpdateSMContext service operation for Home Routed PDU session(s).

It should be noted that if the UE moves into a V-PLMN, the AMF in the V-PLMN cannot insert or change the V-SMF(s) even for Home Routed PDU session(s), and operation 5 may be executed. In the case that the intermediate UPF insertion, removal, or change is performed for the PDU Session(s) not included in "PDU Session(s) to be re-activated," the procedure is performed without N11 and N2 interactions to update the N3 user plane between (R)AN and 5GC. The AMF invokes the Nsmf_PDUSession_ReleaseSMContext service operation towards the SMF in the following scenario: If any PDU Session status may indicate that it is released at the UE, the AMF invokes the Nsmf_PDUSession_ReleaseSMContext service operation towards the SMF in order to release any network resources related to the PDU Session. If the serving AMF is changed, the new AMF may wait until operation 18 is finished with all the SMFs associated with the UE. Otherwise, operations 19 to 22 can continue in parallel to this operation.

In operation 18 (new AMF to N3IWF: N2 AMF Mobility Request ( )), if the AMF has changed and the old AMF has indicated an existing NGAP UE association towards a N3IWF, the new AMF creates an NGAP UE association towards the N3IWF to which the UE is connected. This automatically releases the existing NGAP UE association between the old AMF and the N3IWF.

In operation 19 (N3IWF to new AMF) a N2 AMF Mobility Response ( ) is sent.

In operation 20a (old AMF to (V-)PCF: AMF-Initiated UE Policy Association Termination), if the old AMF previously initiated a UE Policy Association to the PCF, and the old AMF did not transfer the PCF ID(s) to the new AMF (e.g. new AMF is in different PLMN), the old AMF performs an AMF-initiated UE Policy Association Termination procedure to delete the association with the PCF. In addition, if the old AMF transferred the PCF ID(s) in the UE context but the new AMF informed in operations 10 that the UE Policy Association information in the UE context will not be used, then the old AMF performs an AMF-initiated UE Policy Association Termination procedure to delete the association with the PCF.

In operation 21, the new AMF may generate and send an N2 message that includes a Registration Accept and a Pending Slice-Specific Secondary Authentication information element to the UE. The N2 message may also include an Allowed NSSAI element that contains only S-NSSAIs that do not require, based on subscription information, Slice-Specific Secondary Authentication.

In some embodiments, the Pending Slice-Specific Secondary Authentication may be included in the N2 message based on whether the Requested NSSAI includes a S-NSSAI that maps to a S-NSSAI of the HPLMN which in the subscription information has indication that it is subject to network Slice-Specific Secondary Authentication. In such case, the AMF may trigger the network Slice-Specific Secondary authentication and authorization in operation 25 (discussed below).

The Registration Accept may include 5G-GUTI, Registration Area, Mobility restrictions, PDU Session status, Allowed NSSAI, Mapping Of Allowed NSSAI, Configured NSSAI for the Serving PLMN, Mapping Of Configured NSSAI, rejected S-NSSAIs, Periodic Registration Update timer, LADN Information and accepted MICO mode, IMS Voice over PS session supported Indication, Emergency Service Support indicator, Accepted DRX parameters, network support of Interworking without N26, Access Stratum Connection Establishment NSSAI Inclusion Mode, network Slicing Subscription Change Indication, Operator-defined access category definitions, and/or Pending Slice-Specific Secondary Authentication. The Allowed NSSAI for the Access Type for the UE may be included in the N2 message carrying the Registration Accept message. The Allowed NSSAI contains only S-NSSAIs that do not require, based on subscription information, Slice-Specific Secondary Authentication.

The AMF may send a Registration Accept message to the UE indicating that the Registration Request has been accepted. 5G-GUTI may be included if the AMF allocates a new 5G-GUTI. If the UE is already in RM-REGISTERED state via another access in the same PLMN, the UE may use the 5G-GUTI received in the Registration Accept for both registrations. If no 5G-GUTI may be included in the Registration Accept, then the UE uses the 5G-GUTI assigned for the existing registration also for the new registration. If the AMF allocates a new Registration area, it may send the Registration area to the UE via Registration Accept message. If there is no Registration area included in the Registration Accept message, the UE may consider the old Registration Area as valid. Mobility Restrictions may be included in case mobility restrictions applies for the UE and Registration Type is not Emergency Registration. The AMF may indicate the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in operation 18 and receives rejection from the SMF, then the AMF may indicate to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF may indicate the PDU Session status to the UE. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs. The AMF may include in the Registration Accept message the LADN Information for the list of LADNs that are available within the Registration area determined by the AMF for the UE. If the UE included MICO mode in the request, then AMF responds whether MICO mode should be used. The AMF may include Operator-defined access category definitions to let the UE determine the applicable Operator-specific access category definitions.

In the case of registration over 3GPP access, the AMF sets the IMS Voice over PS session supported Indication. In order to set the IMS Voice over PS session supported Indication the AMF may need to perform the UE Capability Match Request procedure to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage.

In the case of registration over non-3GPP access, the AMF sets the IMS Voice over PS session supported Indication.

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" may be included in the Registration Accept message to the UE to inform the UE whether configuration of Access Identity 1 is valid within the selected PLMN. If the AMF received "MCX priority" from the UDM as part of Access and Mobility Subscription data, based on operator policy and UE subscription to MCX Services, "MCX priority" may be included in the Registration Accept message to the UE to inform the UE whether configuration of Access Identity 2 is valid within the selected PLMN. The AMF sets the Interworking without N26 parameter.

If the UDM intends to indicate the UE that subscription has changed, the network Slicing Subscription Change Indication may be included. If the AMF includes network Slicing Subscription Change Indication, then the UE may locally erase all the network slicing configuration for all PLMNs and, if applicable, update the configuration for the current PLMN based on any received information.

The Access Stratum Connection Establishment NSSAI Inclusion Mode may be included to instruct the UE on what NSSAI, if any, to include in the Access Stratum connection establishment. The AMF can set the value to modes of operation a,b,c in the 3GPP Access only if the Inclusion of NSSAI in RRC Connection Establishment Allowed may indicate that it is allowed to do so.

The Pending Slice-Specific Secondary Authentication may be included if the Requested NSSAI includes a S-NSSAI that maps to a S-NSSAI of the HPLMN which in the subscription information has indication that it is subject to network Slice-Specific Secondary Authentication. In such case, the AMF then triggers the network slice-specific secondary authentication and authorization at operation 25.

In operation 21*b* (The new AMF performs a UE Policy Association Establishment( ), the new AMF may send a Npcf_UEPolicyControl Create Request to the PCF. The PCF may send a Npcf_UEPolicyControl Create Response to the new AMF. The PCF triggers a UE Configuration Update Procedure. For an Emergency Registration, this operation may be skipped.

In operation 22, the UE may send a Registration Complete message to the AMF. Unlike conventional systems, the rejected NSSAI will not contain any S-NSSAI for which Slice-Specific Secondary Authentication needs to be performed. Rather, S-NSSAIs for which Slice-Specific Secondary Authentication need to be performed are represented via the Pending Slice-Specific Secondary Authentication.

In particular, the UE may send a Registration Complete message to the AMF when it has successfully updated itself after receiving any of the Configured NSSAI for the Serving PLMN, Mapping Of Configured NSSAI and a network Slicing Subscription Change Indication in operation 21. The UE may send a Registration Complete message to the AMF to acknowledge whether a new 5G-GUTI was assigned. If new 5G-GUTI was assigned, then the UE may pass the new 5G-GUTI to its 3GPP access' lower layer when a lower layer (either 3GPP access or non-3GPP access) indicates to the UE's RM layer that the Registration Complete message has been successfully transferred across the radio interface.

It should be noted that these operations may be required due to the NG-RAN using the RRC Inactive state, and a part of the 5G-GUTI being used to calculate the Paging Frame. It may be assumed that the Registration Complete is reliably delivered to the AMF after the 5G-AN has acknowledged its receipt to the UE.

When the List Of PDU Sessions To Be Activated is not included in the Registration Request and the Registration procedure was not initiated in CM-CONNECTED state, the AMF releases the signaling connection with the UE. When the Follow-on request is included in the Registration Request, the AMF should not release the signaling connection after the completion of the Registration procedure. If the AMF is aware that some signaling is pending in the AMF or between the UE and the 5GC, the AMF should not release the signaling connection immediately after the completion of the Registration procedure.

The Rejected NSSAI does not contain any S-NSSAI for which Slice-Specific Secondary Authentication needs to be performed.

In operation 23, for registration over 3GPP Access, if the AMF does not release the signaling connection, the AMF may send the RRC Inactive Assistance Information to the NG-RAN. For Registration over non-3GPP Access, if the UE is also in CM-CONNECTED state on 3GPP access, the AMF may send the RRC Inactive Assistance Information to the NG-RAN.

Also in operation 23, if the Access and Mobility Subscription data provided by UDM to AMF in operation 14b includes Steering of Roaming information with an indication that the UDM requests an acknowledgement of the reception of this information from the UE, the AMF may provide the UE acknowledgement to the UDM using Nudm_SDM_Info. The AMF also uses the Nudm_SDM_Info service operation to provide an acknowledgment to UDM that the UE received the network Slicing Subscription Change Indication (see operations 21 and 22) and acted upon it.

In operation 24, after operation 14a, and in parallel to any of the preceding operations, the AMF may send a "Homogeneous Support of IMS Voice over PS Sessions" indication to the UDM using Nudm_UECM_Update. If the AMF has evaluated the support of IMS Voice over PS Sessions, and if the AMF determines that it needs to update the Homogeneous Support of IMS Voice over PS Sessions.

In operation 25, if any S-NSSAI of the HPLMN is subject to network slice-specific secondary authentication and authorization, the related procedure is executed at this operation. Once the Slice-Specific Secondary Authentication is completed for all S-NSSAIs, depending on the result of Slice-Specific Secondary Authentication, the AMF may trigger a UE Configuration Update procedure to deliver a new Allowed NSSAI and a new Rejected NSSAI. The mobility related event notifications towards the NF consumers may be triggered at the end of this procedure for cases.

The network slice-specific secondary authentication and authorization procedure of various embodiments as described herein may be performed/executed in operation 25. The procedure may be triggered for an S-NSSAI requiring network slice-specific secondary authentication and authorization with a AAA server, which may be hosted by the H-PLMN operator or a third party which has a business relationship with the H-PLMN. An AAA proxy in the serving PLMN may be involved (e.g. if the AAA Server belongs to a third party). Otherwise, the interactions with the AAA Server may be directly undertaken by the AUSF.

In some embodiments, the network slice-specific secondary authentication and authorization procedure may be triggered by the AMF during a Registration procedure, such as when some of the network slices require Slice-Specific Secondary Authentication, the AMF determines that Slice-Specific Secondary Authentication is required for an S-NSSAI in the current Allowed NSSAI (e.g. subscription change), and/or when the AAA server that authenticated the network slice triggers a re-authentication.

Figure 4:
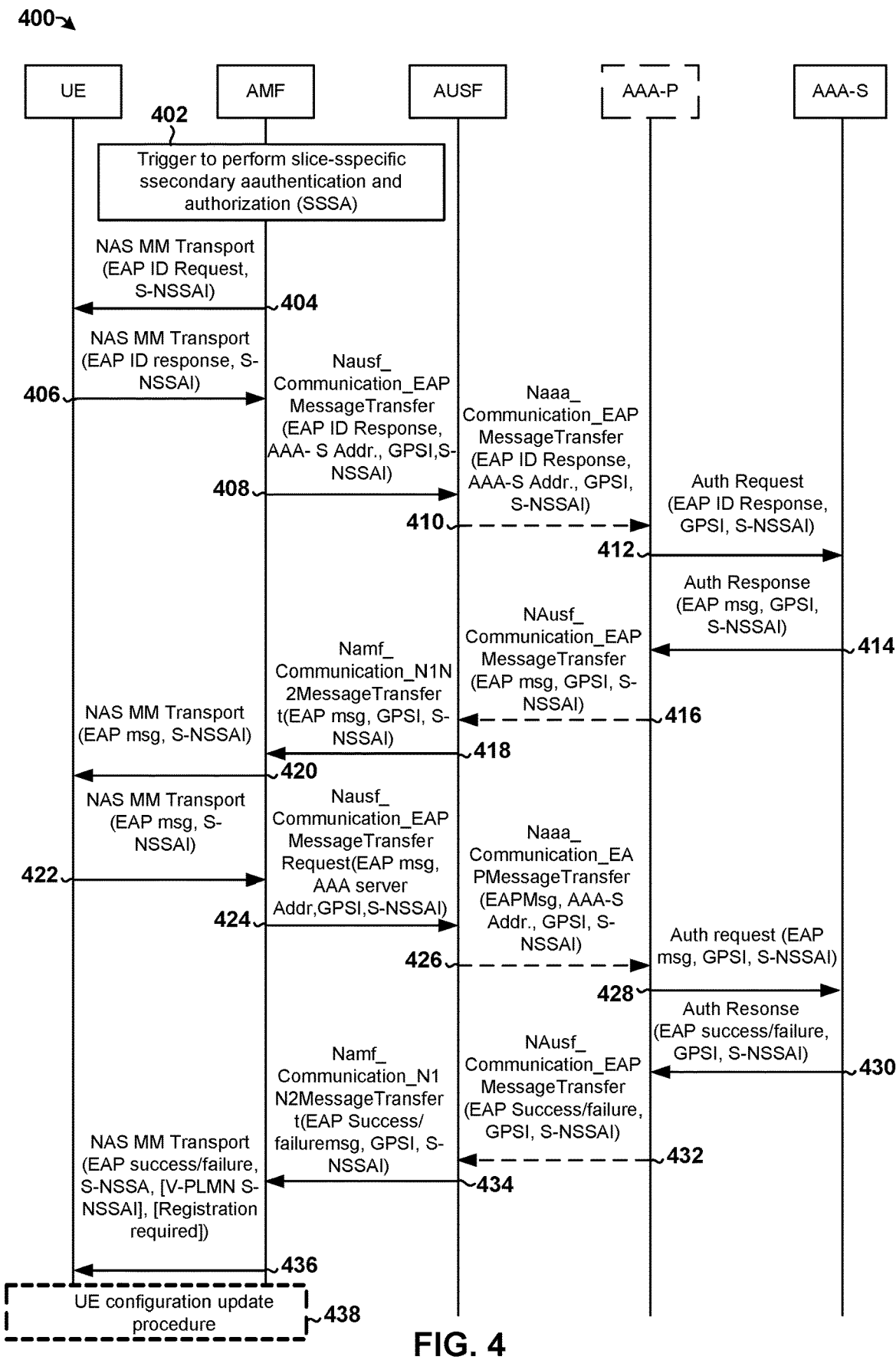
FIG. 4 is call flow diagram illustrating operations and communications between components in a communication system configured to perform a network slice-specific secondary authentication and authorization procedure in accordance with an embodiment.

FIG. 4 illustrates operations and message flows 400 involved in performing a network slice-specific secondary authentication and authorization procedure in accordance with various embodiments. The operations and message flows 400 may be performed as part of operation 25 described with reference to FIG. 3.

In operation block 402, the AMF may trigger the start of the network slice specific secondary authentication procedure for S-NSSAIs determined to require network slice-specific secondary authentication and authorization based on local policy, change of subscription information, or triggers from the AAA Server.

In operation 404, the AMF may request the UE User ID for EAP authentication (EAP ID) for the S-NSSAI in a NAS MM Transport message including the S-NSSAI. This may be the S-NSSAI of the H-PLMN, not the locally mapped S-NSSAI value.

In operation 406, the UE may send the EAP ID for the S-NSSAI alongside the S-NSSAI in an NAS MM Transport message towards the AMF.

In operation 408, the AMF may send the EAP ID to the AUSF in a Nausf_Communication_EAPMessage_Transfer (EAP ID Response, AAA-S address, GIPSI, S-NSSAI).

In operation 410, the AUSF may invoke the Nausf_Communication_EAPmessageTranfser service to forward the message to the AAA-P if the AAA-P is present (e.g. because the AAA-S belongs to a third party). Otherwise the AUSF forwards the message directly to the AAA-S.

In operation 412, the AAA-P may associate the AAA-S address with the S-NSSAI, and forward the EAP Identity message to the AAA-S addressable by the AAA-S address together with S-NSSAI and GPSI.

In operations 414 through 428, EAP-messages are exchanged with the UE. One or more than one iteration of these steps may occur. For example, in operation 414, the AAA-S may send an Auth Response (EAP msg, GPSI, S-NSSAI) to the AAA-P.

In operation 416, the AAA-P may send a NAusf_Communication_EAPMessageTransfer (EAP msg, GPSI, S-NSSAI) to the AUSF.

In operation 418, the AUSF may send a Namf_Communication_N1N2MessageTransfer (EAP msg, GPSI, S-NSSAI) to the AMF.

In operation 420, the AMF may send a NAS MM Transport (EAP msg, S-NSSAI) to the UE.

In operation 422, the UE may send NAS MM Transport (EAP msg, S-NSSAI) to the AMF.

In operation 424, the AMF may send a Nausf_Communication_EAPMessageTransfer Request(EAP msg, AAA server Addr, GPSI,S-NSSAI) to the AUSF.

In operation 426, the AUSF may send a Naaa_Communication_EAPMessageTransfer (EAPMsg, AAA-S Addr., GPSI, S-NSSAI) to the AAA-P.

In operation 428, the AAA-P may send an Auth request (EAP msg, GPSI, S-NSSAI) to the AAA-S.

In operation 430, EAP authentication completes, and the AAA-S may send an EAP-Success/Failure message to the AAA-P (or if the AAA-P is not present, directly to the AUSF) with GPSI and S-NSSAI.

In operation 432, if the AAA-P is used, the AAA-P may send a Nausf_Communication_E APmessageTranfser(EAP-Success/Failure, S-NSSAI, GPSI) to the AUSF.

In operation 434, the AUSF may send a the Namf_Communication_N1N2messageTranfser (EAP-Success/Failure, S-NSSAI, GPSI) to the AMF.

In operation 436, the AMF may transmit a NAS MM Transport message (EAP-Success/Failure, S-NSSAI, V-PLMN mapped S-NSSAI) to the UE. For the S-NSSAI received together with the Registration requested indication, the UE may be configured to not request PDU session establishment until the next Registration procedure is completed in operation block 438.

In operation block 438, if a new Allowed NSSAI or an Unauthorized NSSAI or a new Rejected NSSAI needs to be delivered to the UE, OR if the AMF re-allocation is required, the AMF may initiate the UE Configuration Update procedure.

Figure 5:
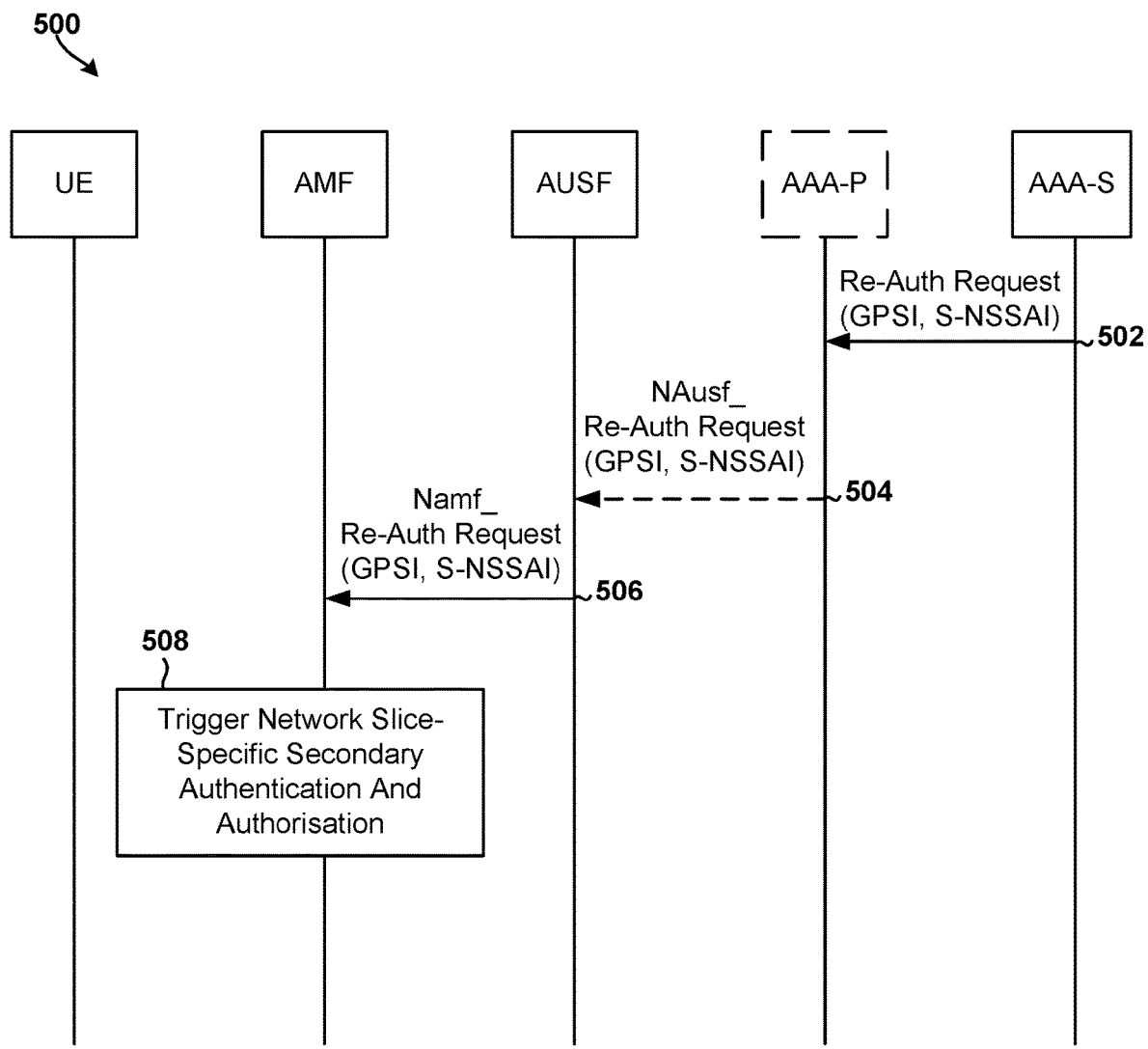
FIG. 5 is call flow diagram illustrating operations and communications between components in a communication system configured to perform AAA server triggered network slice-specific secondary re-authentication and re-authorization procedures in accordance with an embodiment.

FIG. 5 illustrates operations and message flows 500 of performing AAA server triggered network slice-specific secondary re-authentication and re-authorization procedure in accordance with the various embodiments.

In operation 502, the AAA-S(the AAA Server) may request the re-authentication and re-authorization for the network slice specified by the S-NSSAI in the Re-Auth Request message for the UE identified by the GPSI in the Re-Auth Request message. The Re-Auth Request message may be sent to a AAA-P if it is used (e.g., the AAA Server belongs to a third party), otherwise it may be sent directly to the AUSF.

In operation 504, if present, the AAA-P (third party AAA server) may relay the request to the AUSF. In some embodiments, the AAA-P may relay the request via a NAusf_Re-Auth Request (GPSI, S-NSSAI).

In operation 506, the AUSF may request the relevant AMF to re-authenticate/re-authorize the S-NSSAI for the UE (the AUSF may need to retrieve the current UE location). In some embodiments, the AAA-P may request that the AMF re-authenticate/re-authorize the S-NSSAI via a Namf_Re-Auth Request (GPSI, S-NSSAI).

In operation 508, the AMF may trigger the network slice-specific secondary authentication and authorization procedure illustrated and described with reference to FIG. 4.

Figure 6:
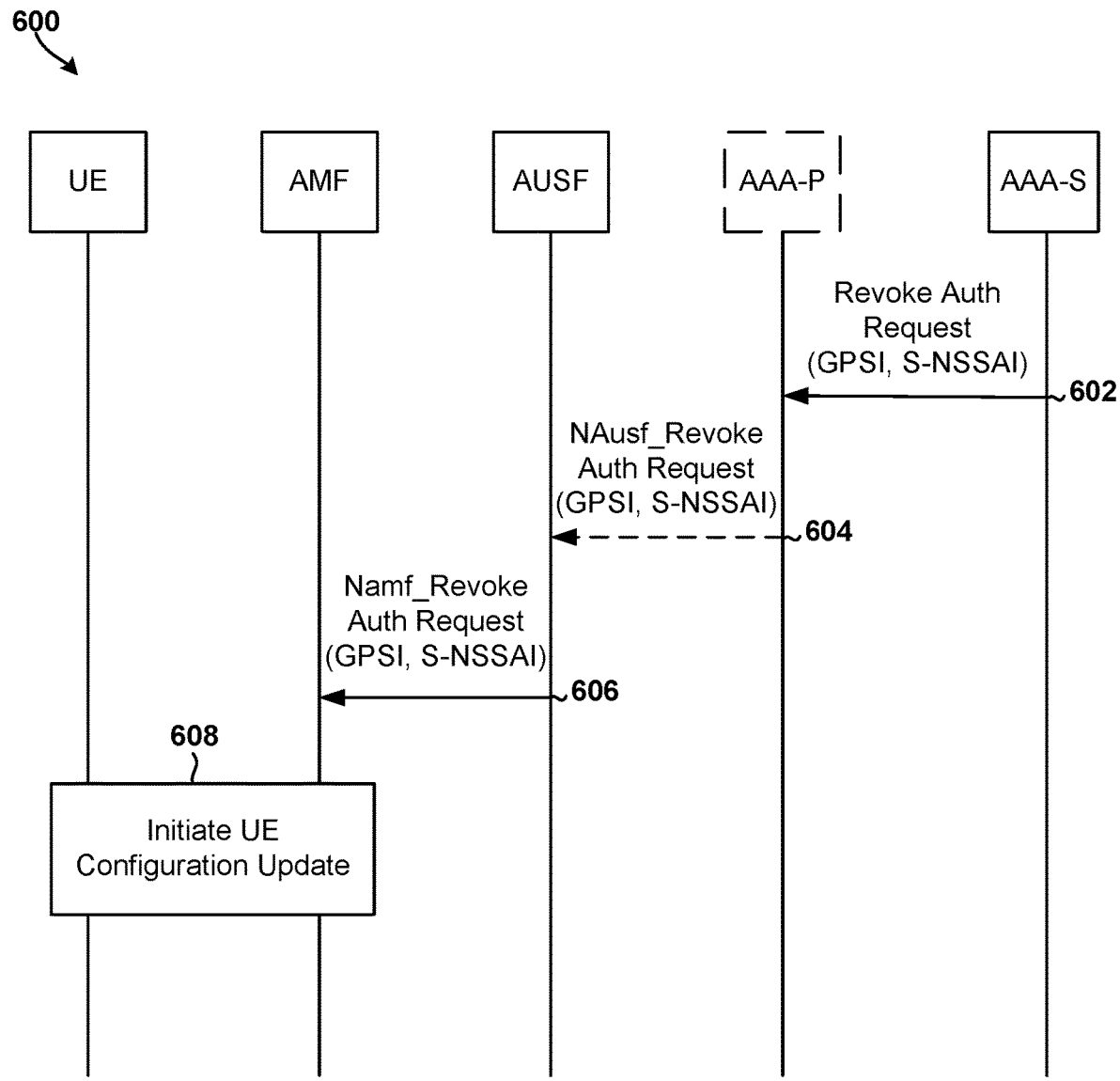
FIG. 6 is call flow diagram illustrating operations and communications between components in a communication system configured to perform AAA server triggered network slice-specific secondary authorization revocation in accordance with an embodiment.

FIG. 6 illustrates operations and message flows 600 of performing AAA server triggered network slice-specific secondary authorization revocation in accordance with an embodiment.

In operation 602, the AAA-S(the AAA Server) may request revocation of authorization for the network slice specified by the S-NSSAI in the Revoke Auth Request (GPSI, S-NSSAI) message for the UE identified by the GPSI in the message. The Revoke Auth Request message may be sent to a AAA-P if it is used (e.g., the AAA Server belongs to a third party), otherwise it may be sent directly to the AUSF.

In operation 604, if present, the AAA-P (third party AAA server) may relay the request to the AUSF. In some embodiments, the AAA-P may relay the request via a NAusf_Revoke Auth Request (GPSI, S-NSSAI).

In operation 606, the AUSF may request the relevant AMF to revoke the S-NSSAI authorization for the UE. In some embodiments, the AAA-P may request that the AMF revoke the S-NSSAI authorization via a Namf_Revoke Auth Request (GPSI, S-NSSAI).

In operation 608, the AMF may initiate a UE configuration update procedure that revoke the S-NSSAI from the Allowed NSSAI. The UE configuration update may include a request to register if the AMF needs to be re-allocated.

UE configuration may be updated by the network at any time using the UE Configuration Update procedure. UE configuration may include UE Policy provided by the PCF, and Access and Mobility Management related parameters decided and provided by the AMF. This includes the Configured NSSAI and its mapping to the Subscribed S-NSSAIs, the Allowed NSSAI and its mapping to Subscribed S-NSSAIs, and the Unauthorized NSSAI if the UE Configuration Update procedure is triggered by the AMF after Slice-Specific Secondary Authentication of S-NSSAIs.

When the AMF has a need to change the UE configuration for access and mobility management related parameters the AMF initiates the relevant procedure. When the PCF has a need to change or provide new UE Policies in the UE, the PCF initiates another procedure.

If the UE Configuration Update procedure requires the UE to initiate a registration procedure, the AMF indicates this to the UE explicitly.

The procedure for changing the UE configuration for access and mobility management related parameters may also be triggered when the AAA server that performed Slice-Specific Secondary Authentication for an S-NSSAI revokes the authentication.

Figure 7:
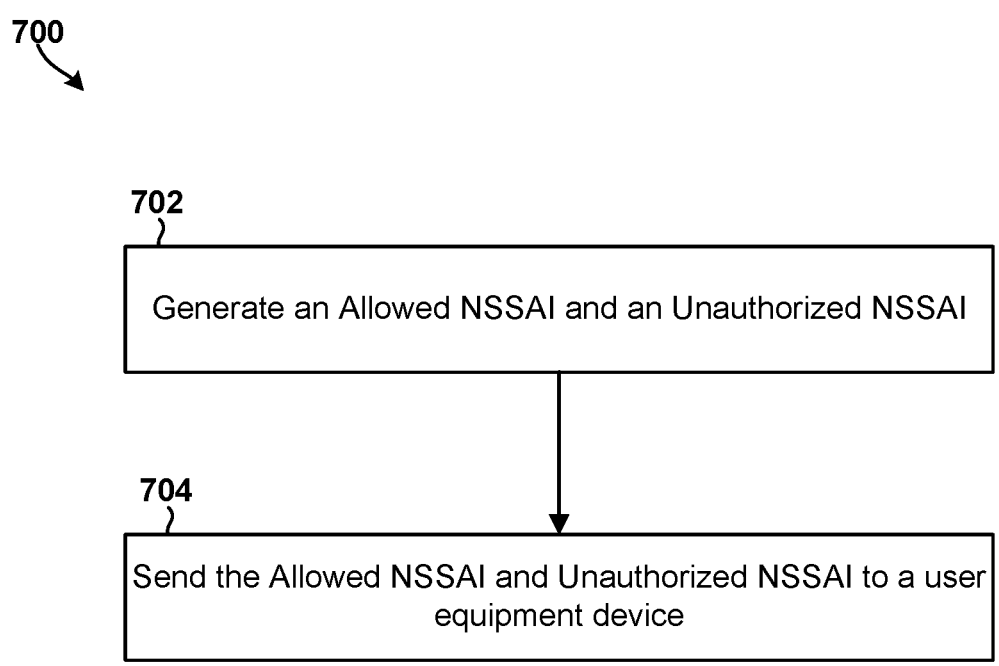
FIGS. 7-9 are process flow diagrams illustrating methods of performing network slice-specific secondary authentication and authorization in accordance in accordance with various embodiments.

FIG. 7 illustrates a method 700 of performing network slice-specific secondary authorization in accordance with an embodiment. The method 700 may be performed by a network server within or functioning as a network component, such as a network server functioning as an AMF component.

In block 702, the network server may generate allowed network slice selection assistance information identifying network slices that were authorized by at least one or both of the service provider or the external provider, and rejected or unauthorized network slice selection assistance information identifying network slices that have not been authorized. In some embodiments, the network server may generate the allowed network slice selection assistance information identifying network slices that were authorized by at least one or both of the service provider or the external provider in block 702 by generating an Allowed NSSAI information element (IE) that identifies network slices that were authorized by at least one or both of the service provider or the external provider. In some embodiments, the network server may generate the rejected or unauthorized network slice selection assistance information identifying network slices that have not been authorized in block 702 by generating rejected or unauthorized network slice selection assistance information that identifies network slices that have not been authorized by at least one or more of the service provider or the external provider. The rejected network slice selection assistance information may be in the form of an Unauthorized NSSAI information element (IE).

In some embodiments, in block 702, the network server may generate the Unauthorized NSSAI information element or the rejected or unauthorized network slice selection assistance information identifying network slices that have not been authorized by generating network slice selection assistance information that identifies network slices that have not been authorized by at least one or more of the service provider or the external provider, and which includes a rejection cause value for each network slice that identifies a reason each network slice has not been authorized.

In block 704, the network server may send the Allowed NSSAI and Unauthorized NSSAI to a user equipment device. For example, in block 704, the network server may send to the user equipment device the allowed network slice selection assistance information and the rejected or unauthorized network slice selection assistance information generated in block 702.

Figure 8:
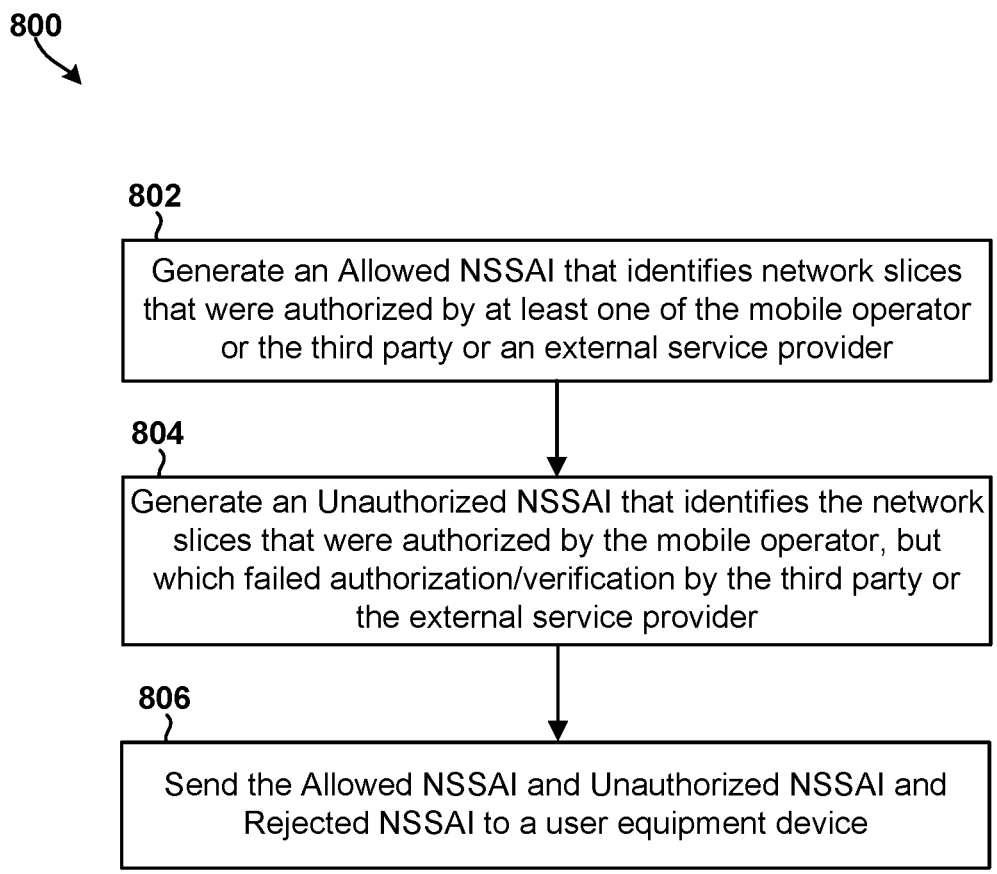

FIG. 8 illustrates a method 800 of performing network slice-specific secondary authorization in accordance with another embodiment. The method 800 may be performed by a network server within or functioning as a network component, such as a network server functioning as an AMF component.

In block 802, the network server may generate allowed network slice selection assistance information (e.g., an Allowed NSSAI IE) that identifies network slices that were authorized by the service provider (e.g., by the mobile network operator based on subscription information and AMF policies), or previously authorized by the mobile network operator (based on subscription information and AMF policies) and an external provider.

In block 804, the network server may generate rejected or unauthorized network slice selection assistance information (e.g., an Unauthorized NSSAI IE) that identifies the network slices that were authorized by the mobile network operator, but which failed authorization/verification by the external provider.

In block 806, the network server may send to the user equipment device the allowed network slice selection assistance information and the rejected network slice selection assistance information generated in block 802. For example, the network server may send the Allowed NSSAI and Unauthorized NSSAI and a Rejected NSSAI to a user equipment device.

Thus, in some embodiments (e.g., embodiments described above with reference to FIGS. 7 and 8, etc.), the network server may be configured to authorize access to network slices that are associated with a service provided by an external provider for access and use by a user equipment device connected to a network via a network component that is associated with the service provider by performing operations that include generating allowed network slice selection assistance information identifying network slices that were authorized by at least one or both of the service provider or the external provider, generating rejected network slice selection assistance information identifying network slices that have not been authorized, and sending to the user equipment device the allowed network slice selection assistance information and the rejected network slice selection assistance information.

In some embodiments (e.g., embodiments described below with reference to FIG. 9, etc.), a user equipment device connected to a network via a network component that is associated with a service provider may be configured to access or use network slices that are associated with the service and provided by an external provider by receiving from a network server allowed network slice selection assistance information identifying network slices that were authorized by at least one or both of the service provider or the external provider, receiving from the network server rejected network slice selection assistance information identifying network slices that have not been authorized, adding a network slice included in the rejected network slice selection assistance information to a requested network slice selection assistance information (NSSAI) information element (IE), and sending the Requested NSSAI IE to the network server.

Figure 9:
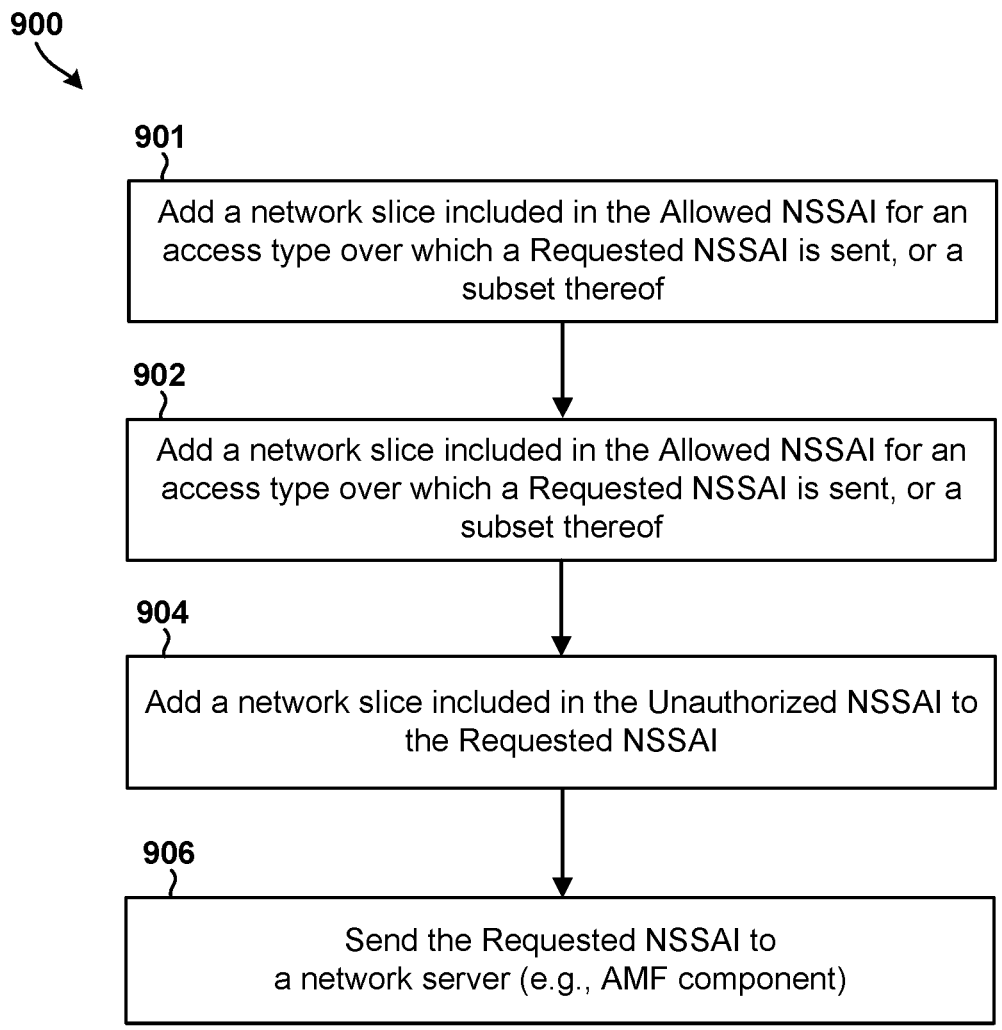

FIG. 9 illustrates a method 900 of performing network slice-specific secondary authorization in accordance with an embodiment. The method 900 may be performed by a processor in a user equipment device.

In block 901, the user equipment device may receive from a network server allowed network slice selection assistance information identifying network slices that were authorized by at least one or both of the service provider or the external provider. Also in block 901, the user equipment device may receive from the network server rejected network slice selection assistance information identifying network slices that have not been authorized. For example, in block 901, the user equipment device may receive an Allowed NSSAI and Unauthorized NSSAI from a network server, such as an AMF network component. In some embodiments, in block 901, the user equipment device may receive an Allowed NSSAI IE that identifies network slices that were authorized by at least one or both of the service provider or the external provider, and rejected network slice selection assistance information that identifies network slices that have not been authorized by at least one or more of the service provider or the external provider.

In block 902, the user equipment device may add to a Requested NSSAI a network slice included in the Allowed NSSAI for an access type over which a Requested NSSAI is sent, or a subset thereof. For example, in block 902, the user equipment device may add to the Requested NSSAI a network slice included in the Allowed NSSAI for an access type over which the Requested NSSAI is sent to the network server. In some embodiments, as part of the operations in block 902, the user equipment device may forgo re-registration attempts for network slices included in the rejected network slice selection assistance information until a network slice-specific authorization procedure has completed. In some embodiments, the user equipment device may also determine whether the network slice-specific authorization procedure has completed, and add the network slice included in the rejected network slice selection assistance information to the Requested NSSAI IE in response to determining that the network slice-specific authorization procedure has completed (or in response to determining that the network slice can now be authorized, the network slice should be resubmitted for authorization by the external provider, etc.). In some embodiments, the user equipment device may also determine whether a network slice included in the rejected network slice selection assistance information should be resubmitted for authorization by the external provider.

Returning to FIG. 9, in block 904, the user equipment device may add to a Requested NSSAI a network slice included in the Unauthorized NSSAI to the Requested NSSAI if the UE determines that the slice can be authorized. For example, in block 904, the user equipment device may add a network slice included in the rejected network slice selection assistance information to a Requested NSSAI IE. In block 906, the user equipment device may send the Requested NSSAI to a network server or component (e.g., the AMF component).

Figure 10:
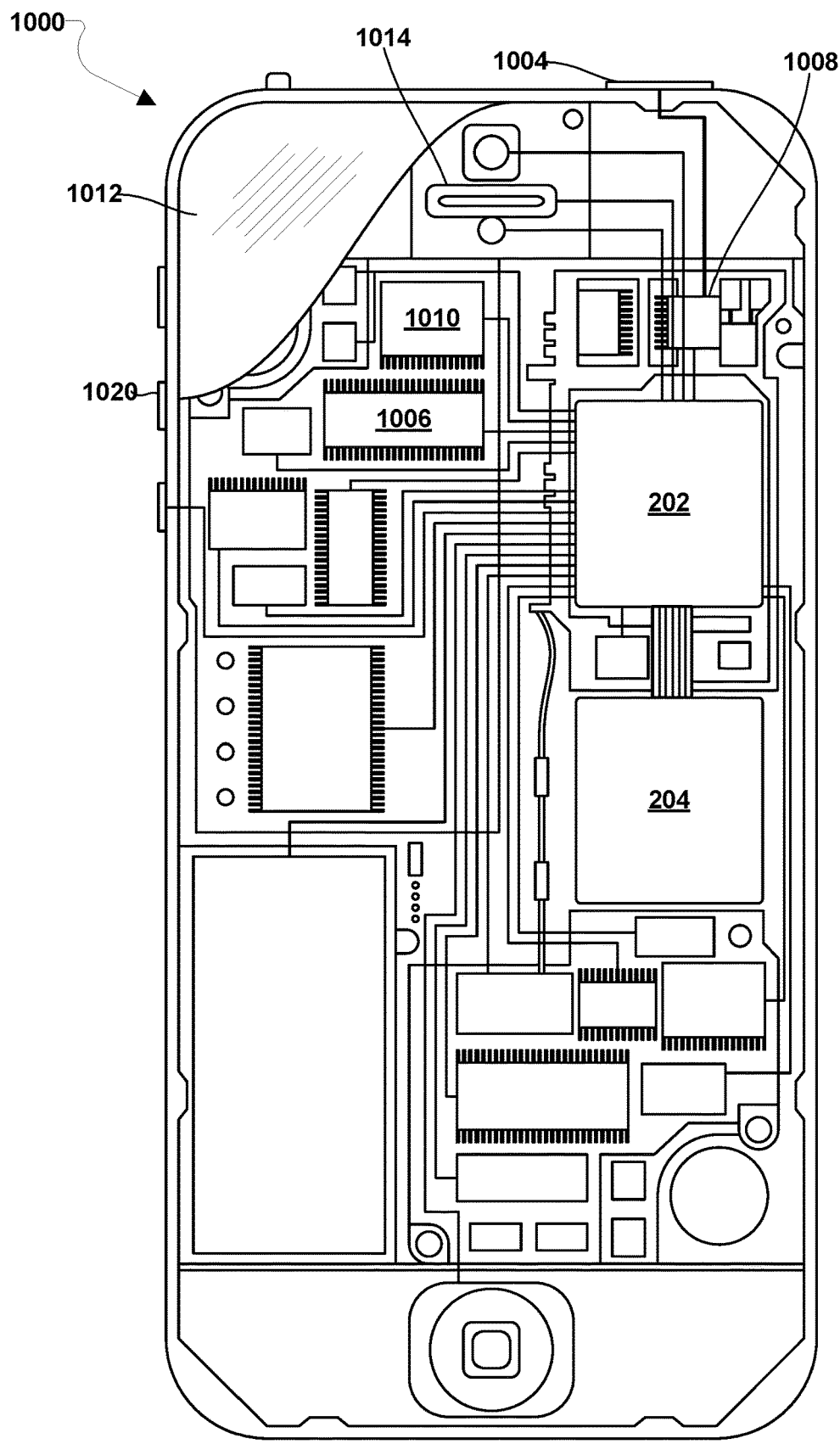
FIG. 10 is a component block diagram of a user equipment device suitable for triggering re-authentication of network slice-specific secondary authentication and authorization in accordance in accordance with various embodiments.

The various aspects may be implemented on a variety of user equipment devices, an example of which in the form of a smartphone is illustrated in FIG. 10. A smartphone 1000 may include a first SOC 202 (e.g., a SOC-CPU) coupled to a second SOC 204 (e.g., a 5G capable SOC). The first and second SOCs 202, 204 may be coupled to internal memory 1006, a display 1012, and to a speaker 1014. Additionally, the smartphone 1000 may include an antenna 1004 for sending and receiving electromagnetic radiation that may be connected to a wireless data link and/or cellular telephone transceiver 1008 coupled to one or more processors in the first and/or second SOCs 202, 204. Smartphones 1000 typically also include menu selection buttons or rocker switches 1020 for receiving user inputs.

A typical smartphone 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1008 and CODEC 1010 may include a digital signal processor (DSP) circuit (not shown separately).

Figure 11:
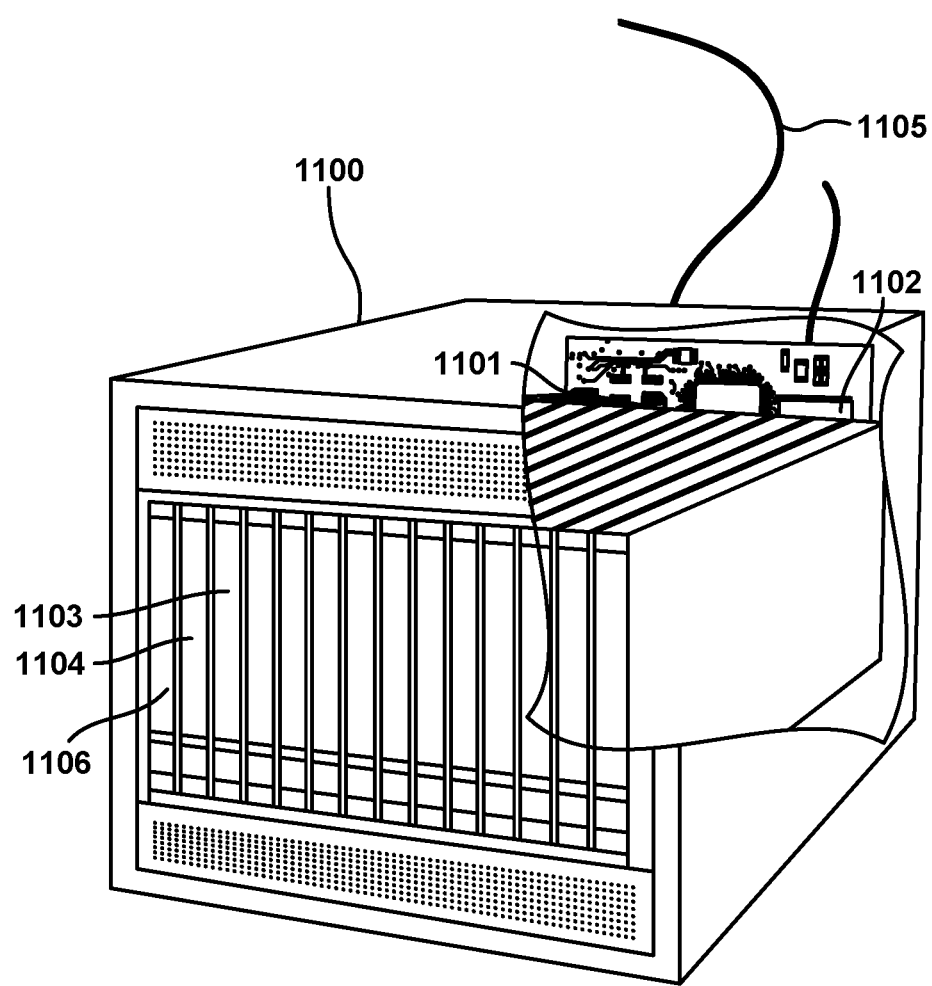
FIG. 11 is a component block diagram of a network server suitable for use with the various embodiments.

The various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1105, such as a local area network coupled to other operator network computers and servers.

The processors may be any programmable microprocessor, microcomputer or multiple processor chip or chips that can be configured by software instructions (applications) to perform a variety of functions, including the functions of the various aspects described in this application. In some user equipment devices, multiple processors may be provided, such as one processor dedicated to wireless communication functions and one processor dedicated to running other applications. Typically, software applications may be stored in the internal memory 1006 before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a user equipment device and the user equipment device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The various aspects provide improved methods, systems, and devices for conserving power and improving performance in multicore processors and systems-on-chip. The inclusion of multiple independent cores on a single chip, and the sharing of memory, resources, and power architecture between cores, gives rise to a number of power management issues not present in more distributed multiprocessing systems. Thus, a different set of design constraints may apply when designing power management and voltage/frequency scaling strategies for multicore processors and systems-on-chip than for other more distributed multiprocessing systems.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects may be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method comprising:
by an access and mobility management function (AMF):
generating allowed network slice selection assistance information identifying one or more network slices that were authorized by at least one of a service provider, which is associated with the AMF, or an external provider;
generating pending network slice selection assistance information identifying one or more network slices for which a slice-specific secondary authentication procedure is pending;
generating rejected network slice selection assistance information identifying one or more network slices that have not been authorized; and
sending to a user equipment device the allowed network slice selection assistance information, the pending network slice selection assistance information, and the rejected network slice selection assistance information.

2. The method of claim 1, wherein generating the rejected network slice selection assistance information identifying the one or more network slices that have not been authorized comprises generating network slice selection assistance information that:
identifies one or more network slices that have not been authorized by at least one or more of the service provider or the external provider; and
includes a rejection cause value for each network slice that identifies a reason each network slice has not been authorized.

3. The method of claim 1, wherein generating the allowed network slice selection assistance information identifying the one or more network slices that were authorized by at least one of the service provider or the external provider comprises generating an allowed network slice selection assistance information information-element (Allowed NSSAI IE) that identifies the one or more network slices that were authorized by at least one of the service provider or the external provider.

4. The method of claim 3, wherein generating the rejected network slice selection assistance information identifying the one or more network slices that have not been authorized comprises generating rejected network slice selection assistance information that identifies one or more network slices that have not been authorized by at least one or more of the service provider or the external provider.

5. A method performed by a processor in a user equipment device for accessing network slices that are associated with a service provided by an external provider for access and use by the user equipment device connected to a network via an access and mobility management function (AMF) that is associated with a service provider, the method comprising:
receiving, from the AMF, allowed network slice selection assistance information identifying network slices that were authorized by at least one of the service provider or the external provider, comprising:
receiving an allowed network slice selection assistance information information-element (Allowed NSSAI IE) that identifies the network slices that were authorized by at least one of the service provider or the external provider;
receiving, from the AMF, rejected network slice selection assistance information identifying network slices that have not been authorized, comprising:

receiving rejected network slice selection assistance information that identifies network slices that have not been authorized by at least one or more of the service provider or the external provider;

receiving, from the AMF, pending network slice selection assistance information identifying one or more network slices for which a slice-specific secondary authentication procedure is pending;

based at least in part on a slice-specific secondary authentication being completed for a network slice included in the rejected network slice selection assistance information, adding the network slice included in the rejected network slice selection assistance information to a requested network slice selection assistance information information-element (Requested NSSAI IE);

based at least in part on a determination that a network slice in the pending network slice selection assistance information should be resubmitted for a slice-specific secondary authentication procedure, adding the network slice in the pending network slice selection assistance information to the Requested NSSAI IE;

sending, by the processor in the user equipment device, the Requested NSSAI IE to the AMF; and forgoing re-registration attempts for the network slices included in the rejected network slice selection assistance information until a network slice-specific authorization procedure has completed.

6. An apparatus comprising:
a processor configured with processor-executable instructions to:
by an access and mobility management function (AMF), generate allowed network slice selection assistance information identifying one or more network slices that were authorized by at least one of a service provider, which is associated with the AMF, or an external provider;
by the AMF, generate pending network slice selection assistance information identifying one or more network slices for which a slice-specific secondary authentication procedure is pending;
by the AMF, generate rejected network slice selection assistance information identifying one or more network slices that have not been authorized; and
by the AMF, send to a user equipment device the allowed network slice selection assistance information, the pending network slice selection assistance information, and the rejected network slice selection assistance information.

7. The apparatus of claim 6, wherein the processor is configured with processor-executable instructions to generate rejected network slice selection assistance information identifying the one or more network slices that have not been authorized by generating network slice selection assistance information that:
identifies one or more network slices that have not been authorized by at least one or more of the service provider or the external provider; and
includes a rejection cause value for each network slice that identifies a reason each network slice has not been authorized.

8. The apparatus of claim 6, wherein the processor is further configured with processor-executable instructions to generate the allowed network slice selection assistance information identifying one or more network slices that were authorized by at least one of the service provider or the external provider by generating an allowed network slice selection assistance information information-element (Allowed NSSAI IE) that identifies the one or more network slices that were authorized by at least one of the service provider or the external provider.

9. The apparatus of claim 8, wherein the processor is further configured with processor-executable instructions to generate rejected network slice selection assistance information identifying the one or more network slices that have not been authorized by generating rejected network slice selection assistance information that identifies one or more network slices that have not been authorized by at least one or more of the service provider or the external provider.

10. A user equipment device, comprising:
a processor configured with processor-executable instructions to:
receive, from an access and mobility management function (AMF), allowed network slice selection assistance information identifying network slices that were authorized by at least one of a service provider, which is associated with the AMF, or an external provider by receiving an allowed network slice selection assistance information information-element (Allowed NSSAI IE) that identifies network slices that were authorized by at least one of the service provider or the external provider;
receive, from the AMF, rejected network slice selection assistance information identifying network slices that have not been authorized by receiving rejected network slice selection assistance information that identifies network slices that have not been authorized by at least one or more of the service provider or the external provider;
receive, from the AMF, pending network slice selection assistance information identifying one or more network slices for which a slice-specific secondary authentication procedure is pending;
based at least in part on a slice-specific secondary authentication being completed for a network slice included in the rejected network slice selection assistance information, add the network slice included in the rejected network slice selection assistance information to a requested network slice selection assistance information information-element (Requested NSSAI IE);
based at least in part on a determination that a network slice in the pending network slice selection assistance information should be resubmitted for a slice-specific secondary authentication procedure, add the network slice in the pending network slice selection assistance information to the Requested NSSAI IE;
send the Requested NSSAI IE to the AMF; and
forgo re-registration attempts for the network slices included in the rejected network slice selection assistance information until a network slice-specific authorization procedure has completed.

11. A non-transitory processor-readable storage medium having stored thereon processor-executable instructions configured to cause a processor to perform operations comprising:
by an access and mobility management function (AMF):
generating allowed network slice selection assistance information identifying one or more network slices that were authorized by at least one of a service provider, which is associated with the AMF, or an external provider;

generating pending network slice selection assistance information identifying one or more network slices for which a slice-specific secondary authentication procedure is pending;

generating rejected network slice selection assistance information identifying one or more network slices that have not been authorized; and sending to a user equipment device the allowed network slice selection assistance information, the pending network slice selection assistance information, and the rejected network slice selection assistance information.

12. The non-transitory processor-readable storage medium of claim 11, wherein the stored processor-executable instructions are configured to cause the processor to perform operations such that generating the rejected network slice selection assistance information identifying the one or more network slices that have not been authorized comprises generating network slice selection assistance information that:

identifies one or more network slices that have not been authorized by at least one or more of the service provider or the external provider; and includes a rejection cause value for each network slice that identifies a reason each network slice has not been authorized.

13. The non-transitory processor-readable storage medium of claim 11, wherein the stored processor-executable instructions are configured to cause the processor to perform operations such that generating the allowed network slice selection assistance information identifying the one or more network slices that were authorized by at least one of the service provider or the external provider comprises generating an allowed network slice selection assistance information information-element (Allowed NSSAI IE) that identifies the one or more network slices that were authorized by at least one of the service provider or the external provider.

14. The non-transitory processor-readable storage medium of claim 13, wherein the stored processor-executable instructions are configured to cause the processor to perform operations such that generating the rejected network slice selection assistance information identifying the one or more network slices that have not been authorized comprises generating rejected network slice selection assistance information that identifies one or more network slices that have not been authorized by at least one or more of the service provider or the external provider.

15. A non-transitory processor-readable storage medium having stored thereon processor-executable instructions configured to cause a processor of a user equipment device to perform operations for accessing network slices that are associated with a service provided by an external provider for access and use by the user equipment device when connected to a network via an access and mobility management function (AMF) that is associated with a service provider, the operations comprising:

receiving, from the AMF, allowed network slice selection assistance information identifying network slices that were authorized by at least one of the service provider or the external provider, comprising:

receiving an allowed network slice selection assistance information information-element (Allowed NSSAI IE) that identifies the network slices that were authorized by at least one of the service provider or the external provider;

receiving, from the AMF, rejected network slice selection assistance information identifying network slices that have not been authorized, comprising:

receiving rejected network slice selection assistance information that identifies network slices that have not been authorized by at least one or more of the service provider or the external provider;

receiving, from the AMF, pending network slice selection assistance information identifying one or more network slices for which a slice-specific secondary authentication procedure is pending;

based at least in part on a slice-specific secondary authentication being completed for a network slice included in the rejected network slice selection assistance information, adding the network slice included in the rejected network slice selection assistance information to a requested network slice selection assistance information information-element (Requested NSSAI IE);

based at least in part on a determination that a network slice in the pending network slice selection assistance information should be resubmitted for a slice-specific secondary authentication procedure, adding the network slice in the pending network slice selection assistance information to the Requested NSSAI IE;

sending, by the processor in the user equipment device, the Requested NSSAI IE to the AMF; and perform operations further comprising forgoing re-registration attempts for the network slices included in the rejected network slice selection assistance information until a network slice-specific authorization procedure has completed.

* * * * *